United States Patent
Wood et al.

(10) Patent No.: US 9,145,313 B2
(45) Date of Patent: Sep. 29, 2015

(54) TURBOELECTRIC COAGULATION APPARATUS

(71) Applicant: Avivid Water Technology, LLC, Windsor, CO (US)

(72) Inventors: Lockett E. Wood, Lyons, CO (US); William R. Lowstuter, Golden, CO (US)

(73) Assignee: Avivid Water Technology, LLC, Longmont, CO (US)

(*) Notice: Subject to any disclaimer, the term of this patent is extended or adjusted under 35 U.S.C. 154(b) by 0 days.

(21) Appl. No.: 13/960,697

(22) Filed: Aug. 6, 2013

(65) Prior Publication Data
US 2014/0138238 A1 May 22, 2014

Related U.S. Application Data

(63) Continuation-in-part of application No. 12/497,472, filed on Jul. 2, 2009, now Pat. No. 8,500,989.

(51) Int. Cl.
*C02F 1/463* (2006.01)
*C02F 1/461* (2006.01)

(52) U.S. Cl.
CPC ....... *C02F 1/463* (2013.01); *C02F 2001/46119* (2013.01); *C02F 2001/46123* (2013.01); *C02F 2001/46133* (2013.01); *C02F 2201/4618* (2013.01); *C02F 2201/46165* (2013.01)

(58) Field of Classification Search
CPC ..................... C02F 2001/46123; C02F 1/463
USPC ........................................ 204/669; 205/755
See application file for complete search history.

(56) References Cited

U.S. PATENT DOCUMENTS

| | | | |
|---|---|---|---|
| 5,004,537 A | | 4/1991 | Brown |
| 6,099,703 A | * | 8/2000 | Syversen et al. .............. 204/232 |
| 6,448,528 B1 | | 9/2002 | Yoshida |
| 2004/0007539 A1 | | 1/2004 | Denes et al. |

(Continued)

FOREIGN PATENT DOCUMENTS

| | | | |
|---|---|---|---|
| CN | 1068799 A | | 2/1993 |
| CN | 101597098 A | | 12/2009 |
| DE | 2657319 A1 | * | 6/1978 |
| NL | 1014806 C2 | * | 2/2001 |

OTHER PUBLICATIONS

English Translation of NL1014806.*

(Continued)

*Primary Examiner* — Keith Hendricks
*Assistant Examiner* — Salil Jain
(74) *Attorney, Agent, or Firm* — Polsinelli PC

(57) ABSTRACT

An apparatus and method for removing contaminant species from water by electrocoagulation are described. Alternating grounded, rotating, planar circular electrodes and stationary planar electrodes function as a Tesla fluid pump when placed in contact with the contaminated water, causing the water to flow between the rotating and stationary electrodes. An insoluble abrasive material introduced into the water removes scale from the electrodes while the water is pumped thereby. A direct electric current is caused to flow between each pair of rotating and stationary electrodes, thereby producing electrocoagulation of the contaminants in the water flowing therebetween. The electrocoagulated materials may be separated from the treated water by filtration or by permitting the treated water to stand for a chosen period.

18 Claims, 17 Drawing Sheets

(56) References Cited

U.S. PATENT DOCUMENTS

| | | |
|---|---|---|
| 2004/0020861 A1 | 2/2004 | Lehmann et al. |
| 2005/0247571 A1 | 11/2005 | Grigg |
| 2007/0175767 A1 | 8/2007 | Suziki |
| 2008/0180031 A1* | 7/2008 | Pokryvailo ............... 315/111.91 |
| 2009/0101490 A1 | 4/2009 | Thiers |
| 2009/0107915 A1 | 4/2009 | Skinner et al. |
| 2011/0297552 A1 | 12/2011 | Boyle et al. |

OTHER PUBLICATIONS

Search Report regarding CN201080031649.X, dated Feb. 24, 2014.

Extended European Search Report regarding EP10 794 788.9, dated Jan. 24, 2013.

International Search Report and Written Opinion regarding PCT/2014/049944, dated Dec. 10, 2014.

* cited by examiner

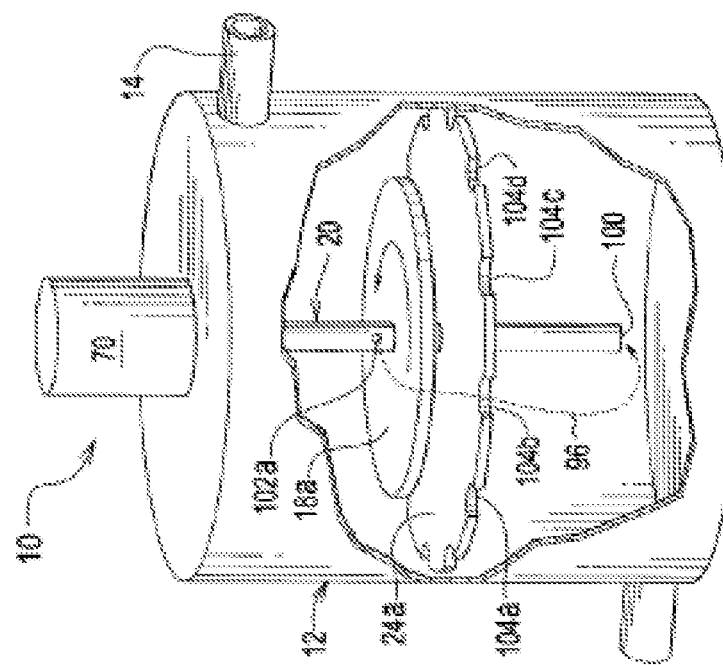
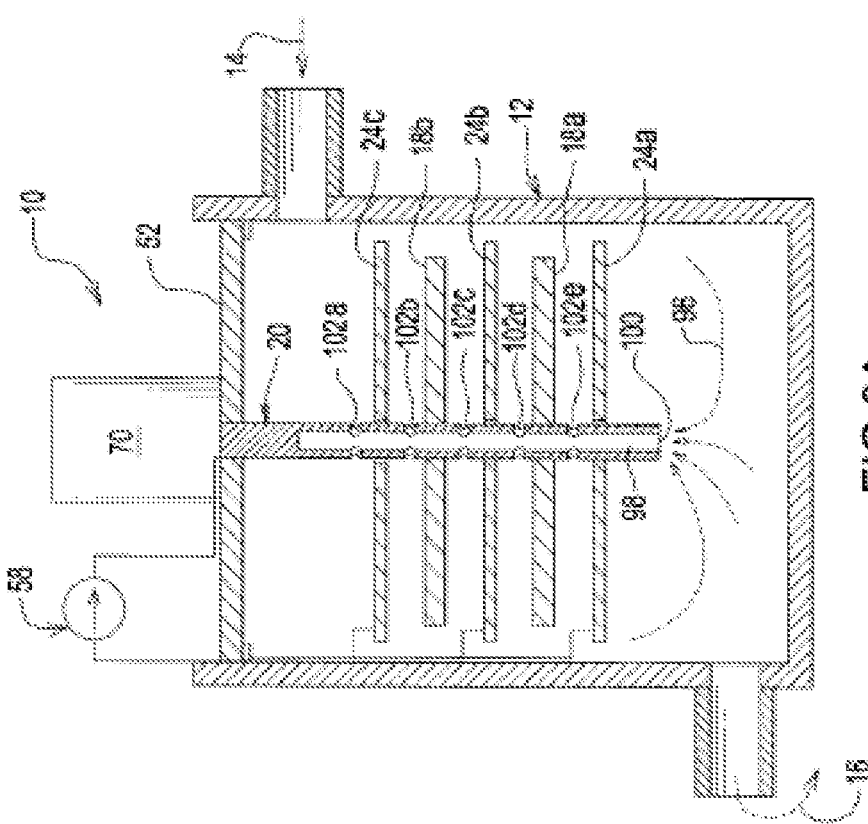
FIG.3A
FIG.3B

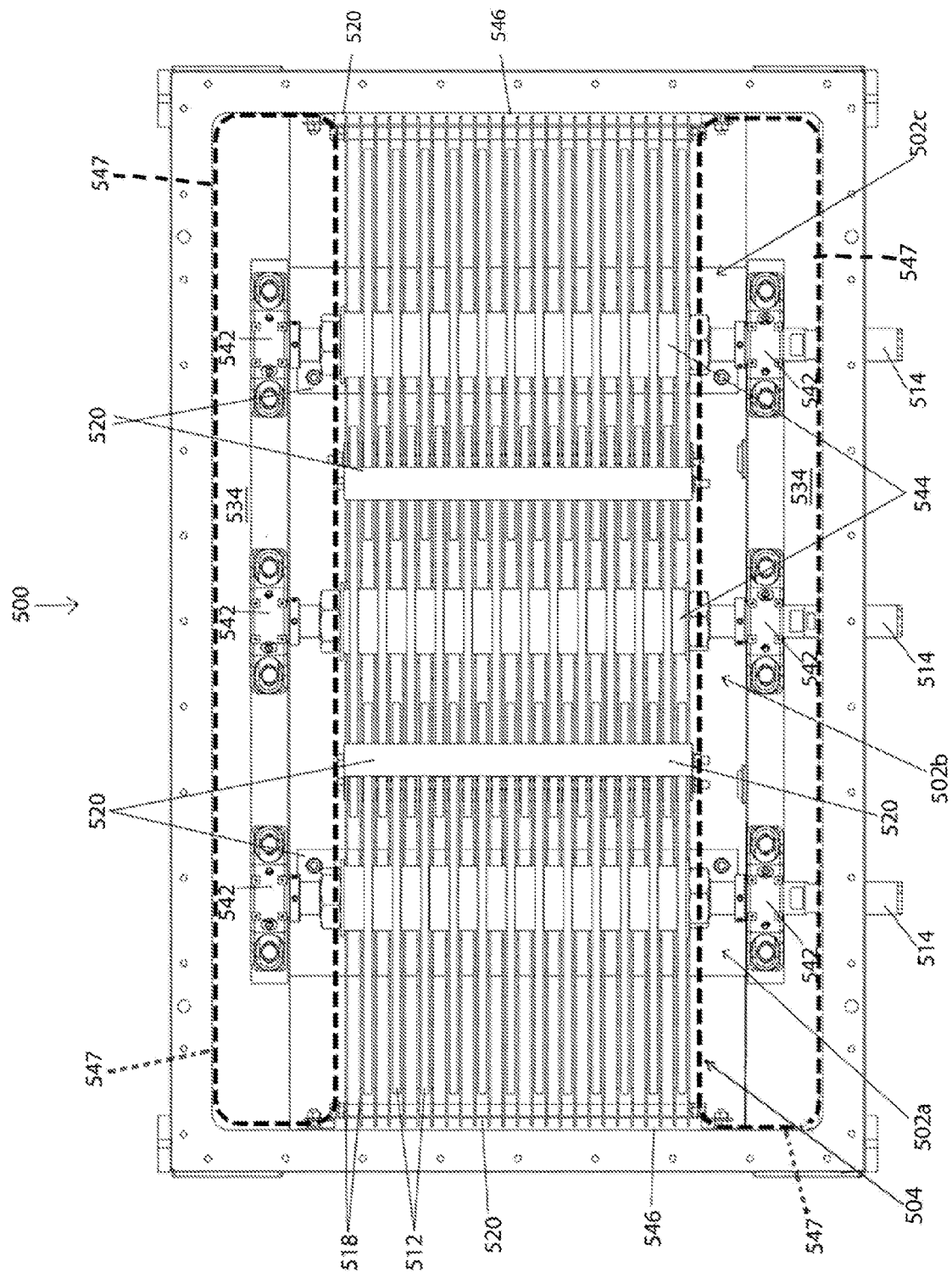

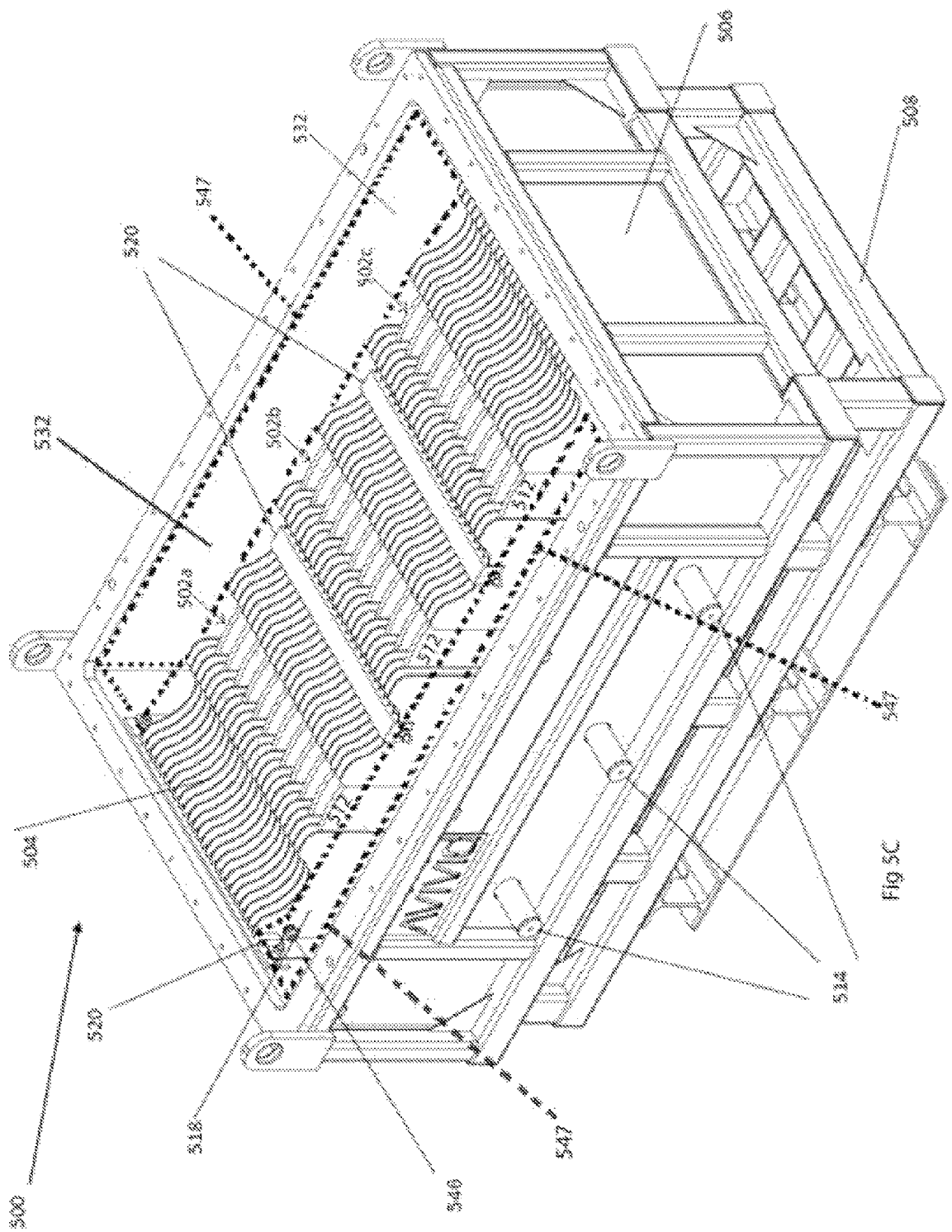

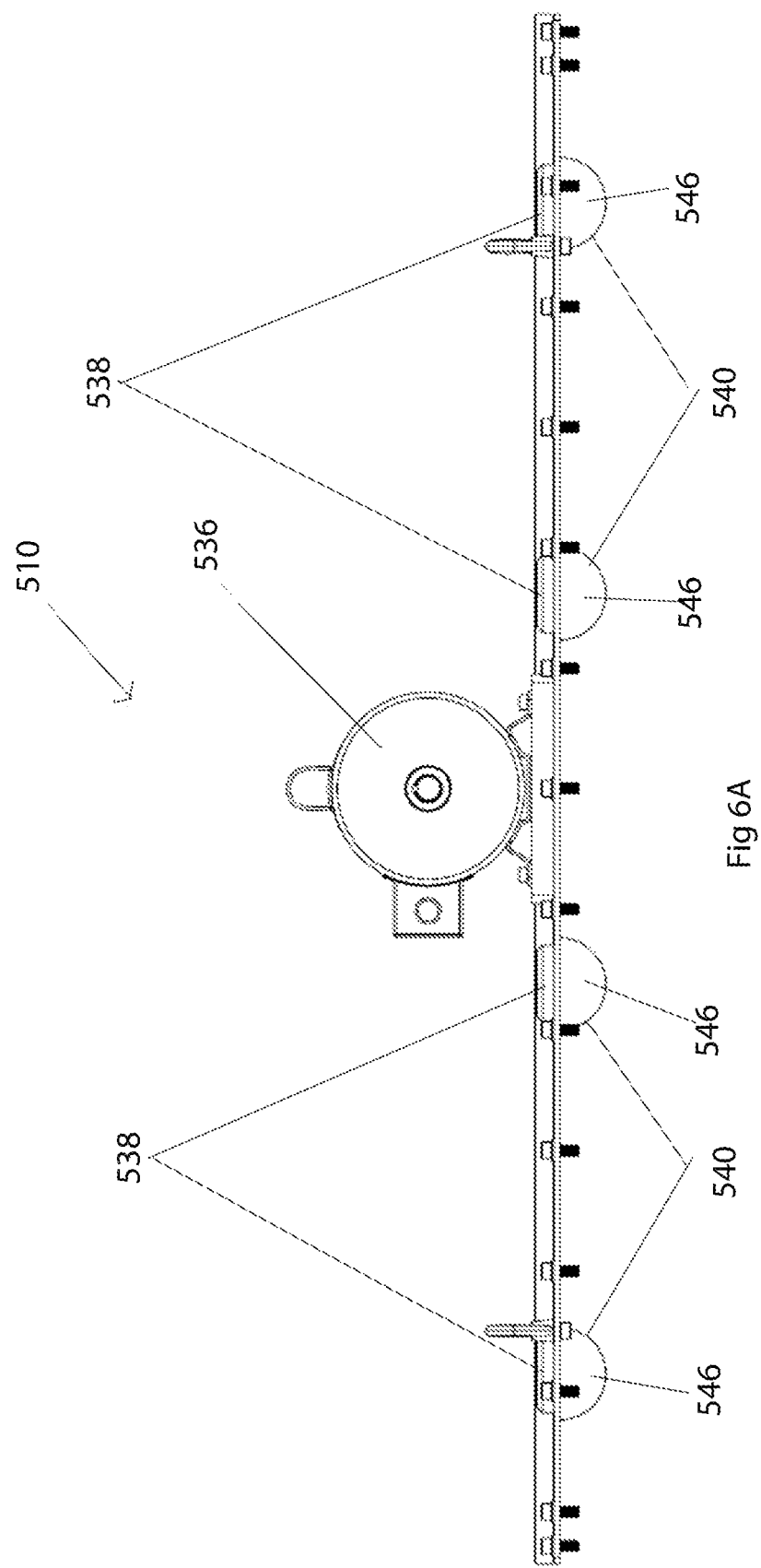

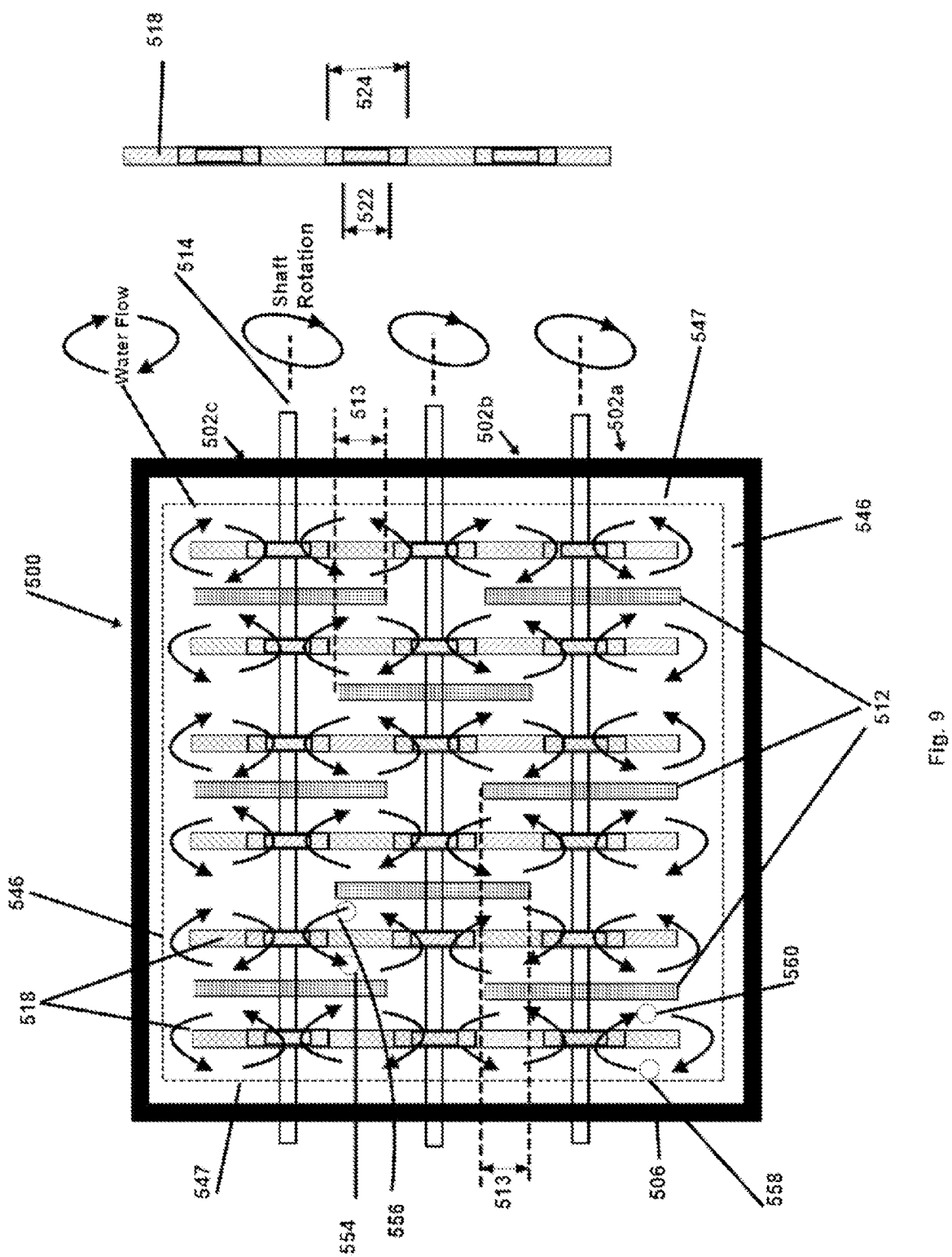

TURBOELECTRIC COAGULATION APPARATUS

RELATED APPLICATIONS

The present application is a continuation-in-part ("CIP") of co-pending U.S. patent application Ser. No. 12/497,472 ("the '472 application"), which was filed Jul. 2, 2009 and titled "Turboelectric Coagulation Apparatus." The present application claims priority to the '472 application and hereby incorporates by reference the '472 application in its entirety into the present application.

TECHNICAL FIELD

The present disclosure relates generally to water purification and, more particularly, to purification of water using electrocoagulation.

BACKGROUND

Rivers, canals, estuaries and other water bodies which are used as sources of clean water in developing countries have become polluted by indiscriminate discharge of industrial and animal waste products and by natural processes such as geochemical processes which have introduced dangerous elements including arsenic into the groundwater. Wastewater generated by increasing population, industry and other sources has become problematic in developed countries as well.

Coagulation is an important reaction for water treatment. Ions from heavy metals, as an example, and colloids generally remain in solution as a result of their electric charge. By adding ions having opposite charges to the colloids, the ions and colloids can be destabilized and coagulation can be achieved by chemical or electrical methods. In the case of chemical coagulation, a coagulant, such as Alum [$Al_2(SO_4)_3 \cdot 18H_2O$] or ferric chloride, as examples, may be employed. However, chemical coagulation tends to generate large volumes of sludge with significant bound water content.

In electrocoagulation, reactive ions may be generated in situ by oxidation of an effective anode material, or reactive metallic hydroxides may be generated within the effluent, and offers an alternative to the addition of metal salts, polymers or polyelectrolytes. Treatment of wastewater by electrocoagulation has been practiced for about 100 years and currently used in many industries. Metals, colloidal solids and suspended particles and oil droplets may be removed from wastewater by agglomeration or coagulation and resultant separation from the aqueous phase. An electrocoagulated floc tends to contain less water, and is more readily filterable.

Basically, an electrocoagulation reactor includes pairs of parallel conductive metal plates, known as sacrificial electrodes which may be of the same or of different materials. When connected to an external source of electrical power, the anode material will electrochemically corrode, while the cathode will be subject to passivation. Metals such as aluminum and iron are commonly used to generate ions in the water which, as stated hereinabove, remove the contaminants by chemical reaction and precipitation, or by causing colloidal materials to coalesce making these species less soluble.

It is known that electrodes in electrocoagulation reactors often experience scaling or other metal coating processes over time which diminish their effectiveness as electrodes, thereby necessitating the use of readily removable and resurfaceable structures.

A Tesla pump includes a plurality of parallel, flat rigid disks having a suitable diameter and keyed to a shaft driven by a motor such that the disks may rotate together as the shaft is rotated. Fluid is caused to enter the pump in the vicinity of the shaft, and liquid adhesion and viscosity directs the fluid toward the periphery as the disks are rotated, thereby imparting energy thereto as the fluid exits the apparatus.

SUMMARY

Accordingly, it is an object of the present disclosure to provide an electrocoagulation apparatus wherein the electrode surfaces are cleaned of scale and other deposits during use thereof.

Additional non-limiting objects, advantages and novel features of the disclosure will be set forth in part in the description which follows, and in part will become apparent to those skilled in the art upon examination of the following or may be learned by practice of the various embodiments. The objects and advantages of the various embodiments may be realized and attained by means of the instrumentalities and combinations particularly pointed out in the appended claims.

To achieve the foregoing and other objects, and in accordance with the purposes of the present disclosure, as embodied and broadly described herein, the apparatus for removing contaminants from water, hereof, includes in combination: a container for holding the water; at least one rotatable planar electrode having an axis; a spindle having an axis collinear with the axis of each of the at least one rotatable electrodes, the at least one rotatable electrode being attached to the spindle; at least one planar stationary electrode having an opening therein effective for permitting the spindle to pass therethrough disposed in the proximity of and parallel to the plane of the at least one rotatable electrode, and forming a volume therebetween, the at least one rotatable electrode and the at least one stationary electrode being disposed in the water; a source of current in electrical contact with the at least one stationary electrode and the at least one rotatable electrode effective for causing electrocoagulation of the contaminants in the water; and means for rotating the spindle about the axis thereof at a chosen angular velocity such that the contaminated water is caused to pass through the volume.

In another aspect of the present disclosure, and in accordance with its objects and purposes, the method for removing contaminants from water, hereof, includes the steps of: providing at least one planar rotatable electrode capable of being rotated about an axis of rotation by a spindle collinear with this axis, and at least one planar stationary electrode disposed in the proximity of and parallel to the plane of the at least one rotatable electrode and forming a volume therebetween, the spindle passing through a first opening in the at least one stationary electrode; contacting the at least one rotatable electrode and the at least one stationary electrode with the contaminated water; rotating the spindle at a chosen angular velocity such that the contaminated water is caused to pass through the volume; and applying a current between the at least one stationary electrode and the at least one rotating circular electrode effective for causing electrocoagulation of the contaminants in the water.

Benefits and advantages of the present disclosure include, but are not limited to, providing an electrocoagulation reactor in which the electrodes are cleaned as the apparatus removes unwanted contaminants from the water. Another benefit of the present rotating plate apparatus is that a smaller volume apparatus is effective for treating the same volume of water as a larger stationary plate apparatus, due to multiple exposures of the water to the rotating electrodes.

BRIEF DESCRIPTION OF THE DRAWINGS

The accompanying drawings, which are incorporated in and form a part of the specification, illustrate the embodiments of the present disclosure and, together with the description, serve to explain the principles of the various embodiments. In the drawings:

FIG. 3A is a schematic representation of a side view of a vertical, hollow shaft embodiment for rotating the circular electrodes illustrating the transportation of water through the shaft as part of the pumping action of the apparatus, while FIG. 3B is a schematic representation of a perspective view of the apparatus shown in FIG. 3A hereof further illustrating peripheral slots in the stationary electrode for permitting water to flow through the electrode.

FIG. 5B shows a schematic representation of a top view thereof, and FIG. 5C illustrates a schematic representation of an isometric view of the assembled apparatus.

FIG. 6A is a front view of the lid assembly of the electrocoagulation apparatus as illustrated in FIG. 5A.

FIG. 9 is an up-close schematic view of various flow paths of water inside the electrocoagulation apparatus as illustrated in FIG. 5A.

DETAILED DESCRIPTION

Briefly, the present disclosure describes an apparatus and method for removing contaminant species from water by electrocoagulation. The water is recirculated by at least one flat rigid disk having a suitable diameter and keyed to a motor driven shaft such that the disk may rotate as the shaft is rotated, and at least one flat, rigid stationary plate spaced apart and parallel to the disk, which together function as a fluid pump. Fluid, such as contaminated water, is caused to enter through at least one opening in the stationary plate in the vicinity of the shaft, and liquid adhesion and viscosity directs the fluid toward the periphery of the disk/plate assembly as the disk is rotated, thereby imparting energy thereto as the fluid departs the outer periphery of the rotating disk. The fluid then recirculates back to the opening near the shaft where it again enters the volume between the stationary plate and the rotating disk such that it can be again accelerated by the rotating disk back to the periphery. Additional flat rigid disks keyed to the motor driven shaft such that they rotate together as the shaft is rotated, and additional stationary plates disposed in an alternating, plate/disk/plate arrangement, as an example, may be added. The apparatus may be located in a reaction tank or reactor, and the flow rate of the water into and out of the reactor and the speed of the rotation of the disks determine the number of repetitions of the water through the pump.

An electric current is caused to flow between each pair of rotating and stationary electrodes, thereby producing electrocoagulation of the contaminants in the water flowing therebetween. The pumping action continuously re-exposes the water to the electrocoagulation process which enables a smaller reactor to be employed for a given volume of water to be processed. An insoluble abrasive material introduced into the water removes scale from the electrodes as the water is pumped thereby.

The electrocoagulated materials may be separated from the treated water by filtration or by permitting the treated water to stand for a chosen period.

Figure 1A:
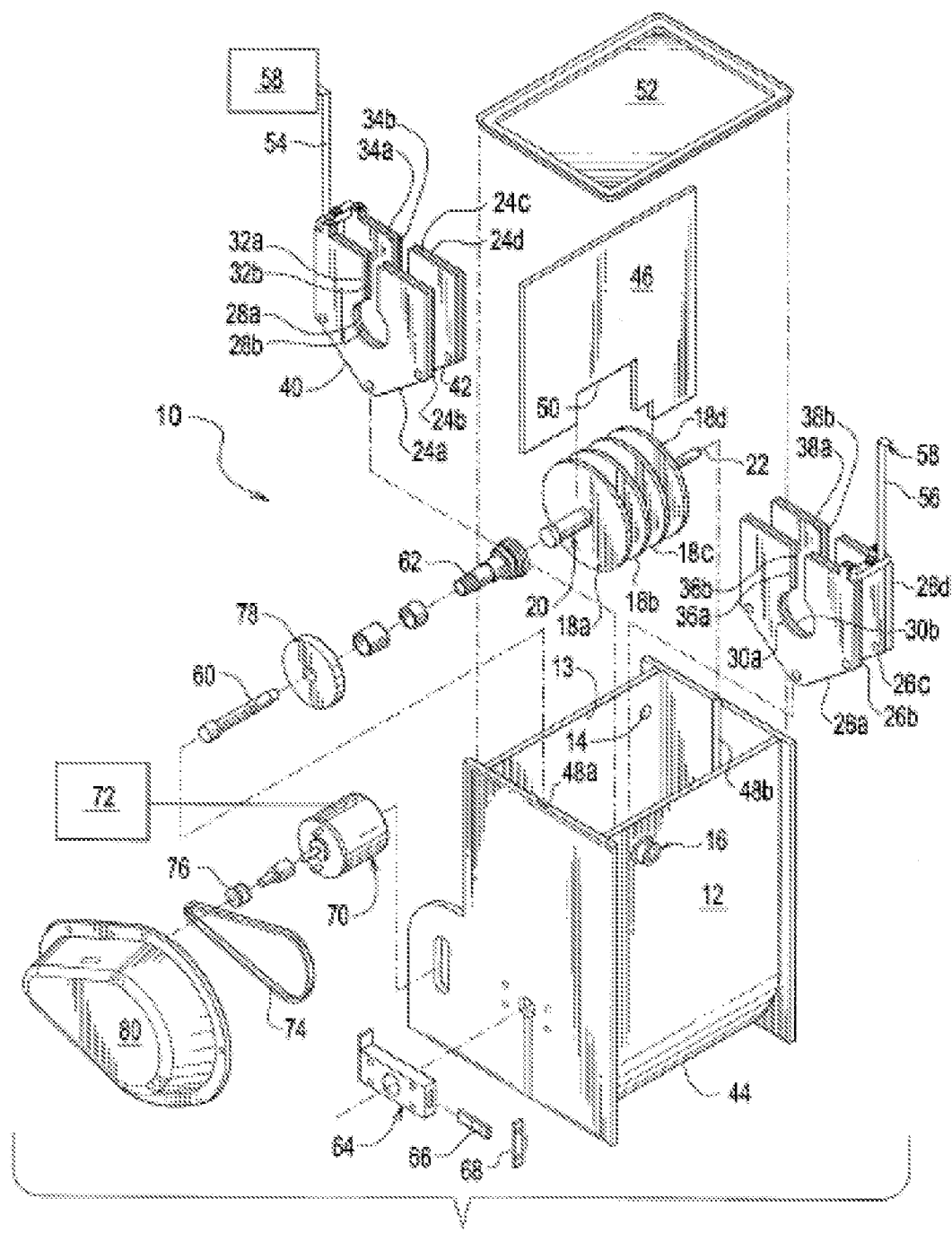
FIG. 1A is a schematic representation of an exploded view of an embodiment of the present electrocoagulation apparatus.

Reference will now be made in detail to the present embodiments of the invention, examples of which are illustrated in the accompanying drawings. In the FIGURES, similar structure will be identified using identical reference characters. Turning now to FIG. 1A, a schematic representation of an exploded view of an embodiment of the present electrocoagulation apparatus, 10, is shown. Container, 12, having internal volume, 13, has inlet, 14, and outlet, 16, ports for introducing contaminated water to and permitting treated water to exit from container 12, respectively. Planar, spaced apart, circular, electrically conducting electrodes, 18a-18d, disposed parallel to each other, and connected by electrically conducting shaft, spindle, or axle 20, capable of rotation about longitudinal axis, 22, and stationary planar, spaced-apart, electrically conducting electrodes, 24a,b, 24c,d, 26a,b, and 26c,d, disposed parallel to each other, are shown as disposed in pairs of electrodes adapted for receiving circular electrodes 18a-18d, respectively, therebetween. It should be mentioned that although electrodes 18 are shown as being circular in the FIGURES, other shapes having an axis of rotation may be contemplated. Electrodes 18 may be constructed using reactive metals such as aluminum, iron, calcium, and magnesium, as examples, while electrodes 24 and 26 may be constructed from an inert conducting material such as stainless steel, titanium, platinum, and graphite, as examples. Alternatively, the stationary electrodes may be constructed using reactive metals, while the rotating electrodes may be fabricated using inert conducting materials. As may be observed in EXAMPLE 2, hereof, electrodes fabricated from different reactive metals may be employed on the same shaft. Openings, 28, and 30, shown in stationary electrodes 24a and 24b and 26a and 26b, respectively, as examples, permit spindle 20 to pass therethrough without coming in contact therewith. Clearly, electrode pairs 24c, 24d, 26c, and 26d, have similar openings (not shown in FIG. 1A) in order to permit spindle 20 to pass therethrough. Additional openings, 32a,b and 36a,b, in plates 24a,b and 26a,b, respectively, and 34a,b and 38a,b in plates 24c,d and 26c,d, respectively are contiguous with openings 28a,b, 30a,b, respectively, and those openings not shown in FIG. 1A, and permit water to flow more freely into the volumes formed between circular electrodes 18a-18d and stationary electrodes 24a-26d. Stationary electrodes 24 and 26 may have curved or angled bases, 40 and 42, as examples, to better fit the inside shape (not shown in FIG. 1A) of the bottom portion, 44, of container 12. This feature, along with the use of baffle, 46, adapted to fit into grooves, 48a and 48b, in container 12, and having indentation, 50, to enable the baffle to more closely fit around stationary electrodes 24 and 26, reduce the quantity of water traveling between fluid input 14 and output 16 of container 12 without passing through the volumes formed between the circular and stationary electrodes, in this specific example. Cover, 52, prevents materials from exiting container 12 as a result of frothing, as an example.

Electrically conducting connectors, 54, and 56, permit a voltage from direct current source, 58, to be applied to stationary electrodes 24 and 26, respectively. Electrically conducting drive shaft components, 60, and, 62, which when connected to spindle 20, enable the rotation of circular electrodes 18. The assembled drive shaft components, in cooperation with brush housing, 64, brush, 66, or other electrically conducting slip ring mechanism and end cap, 68, permit current flow between the electrodes through the water in volume 13. Current source 58 may be a constant current source or other current waveform effective for promoting coagulation. End cap 68 may be grounded, or otherwise provide a current return to source 58.

Electric motor, 70, powered by electric power source, 72, drives belt, 74, using first pulley, 76, attached thereto, the combination driving second pulley, 78, attached to drive shaft component 60 which turns electrodes 18 through spindle 20. Accompanying bushings and shaft seals provide smooth rotation of the drive shaft and prevention of water leakage from container 12. Power source 72 may include batteries, solar cells, and appropriate line voltage. Cover, 80, provides protection for users from belt 74. It is anticipated that other driving apparatus may be utilized to turn shaft component 60 such as a stepping motor for directly turning shaft 60, as an example.

Figure 1B:
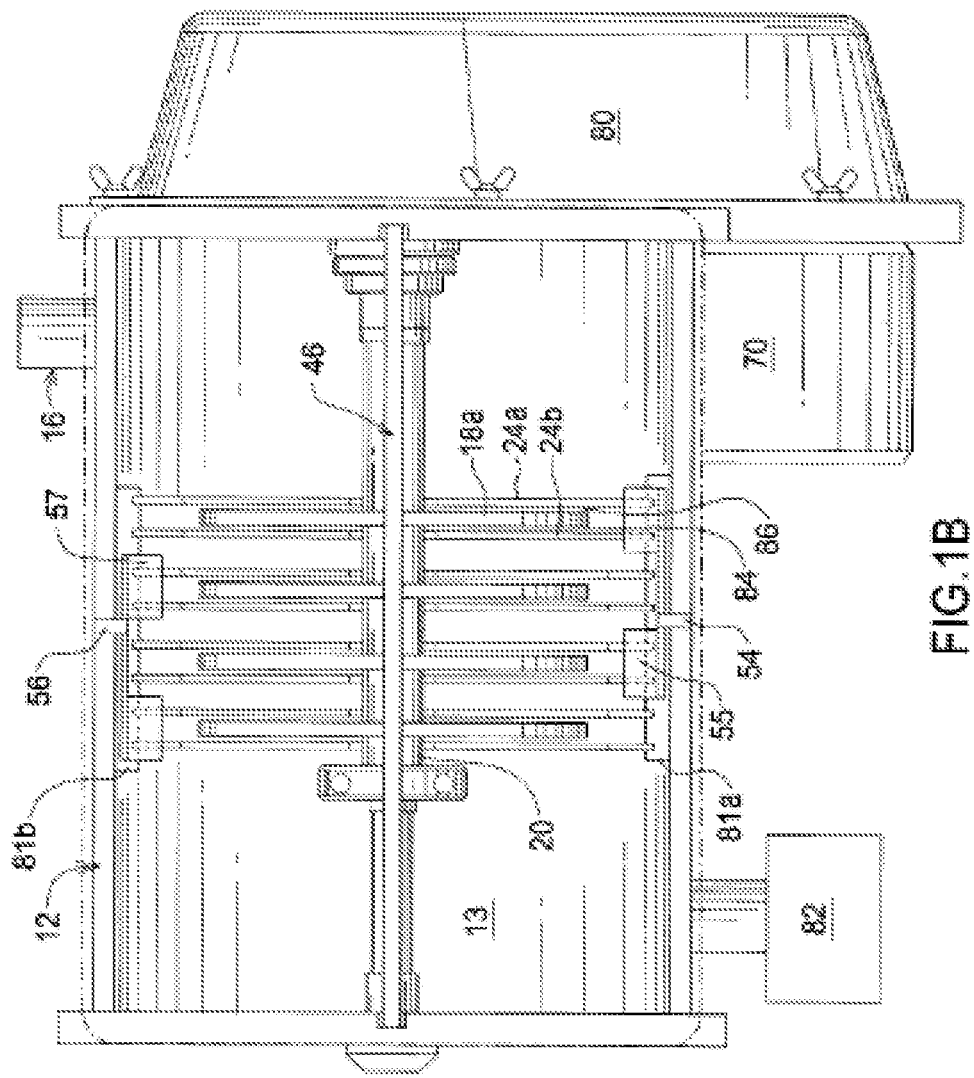
FIG. 1B shows a schematic representation of a top view thereof.

FIG. 1B shows a top view of the embodiment of the electrocoagulation apparatus illustrated in FIG. 1A hereof. Additionally shown are water pump, 82, for flowing water through volume 13 at a chosen rate, thereby generating a selected dwell time for the water in the electrocoagulation environment, and volumes, 84, and 86, between rotating circular electrode 18a and stationary electrodes 24a and 24b, respectively, as examples, through which the rotating electrodes force the water to be treated.

Figure 1C:
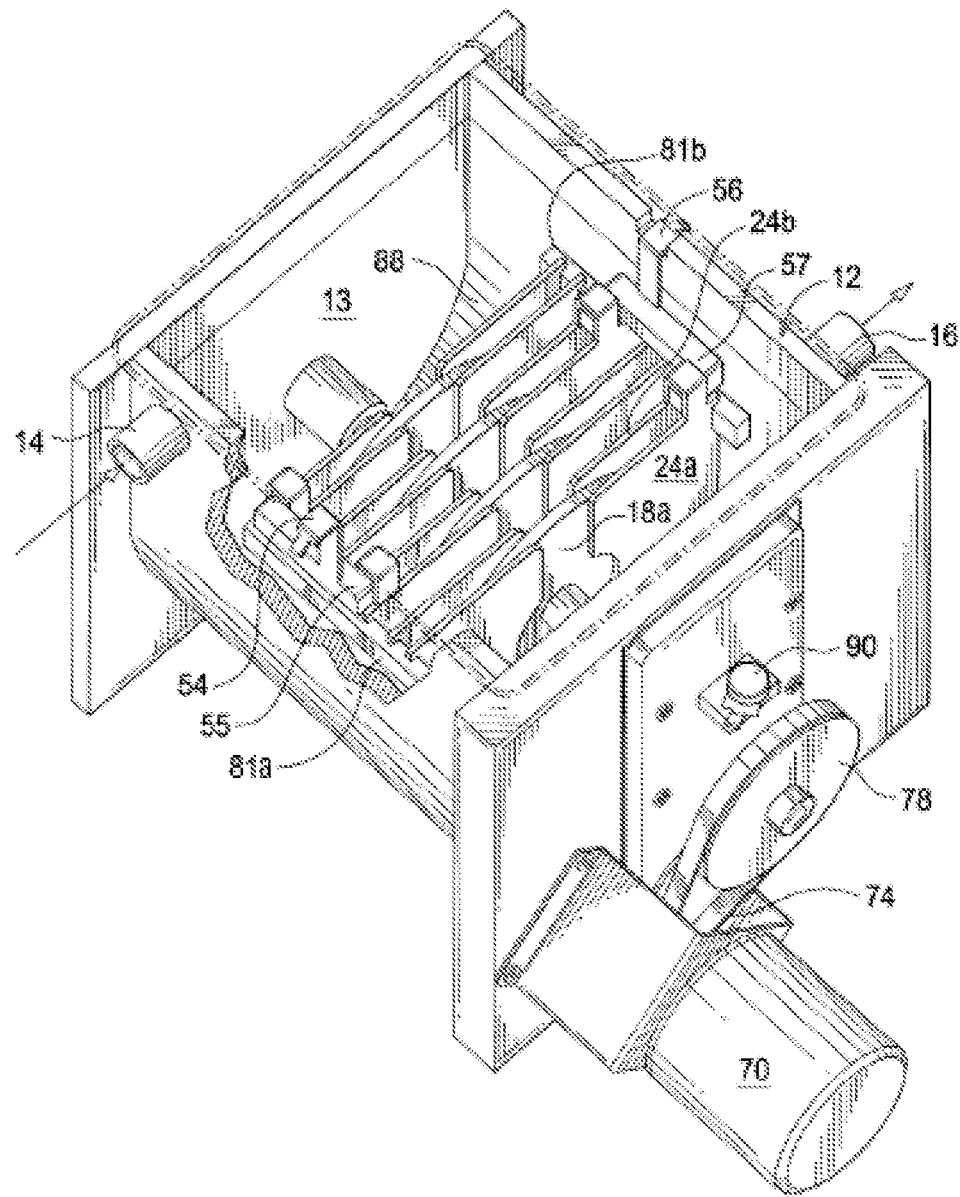
FIG. 1C illustrates a schematic representation of a perspective view of the assembled apparatus.

FIG. 1C illustrates a perspective view of the assembled apparatus illustrated in FIG. 1A hereof, showing a slightly different configuration for motor 70, a curved lower interior portion, 88, for container 12, and an electrical connection, 90, for cover plate 68.

In use, electrocoagulation apparatus 10, is filled with water to be treated such that the electrodes are in contact therewith. Generally, the electrodes are submerged in the water, although complete immersion is not required. An amount of insoluble abrasive material effective for keeping the electrodes free of scale and other coatings may be introduced into container 12 if the raw water sample to be treated contains inadequate abrasive material suspended therein. The abrasive material may be chosen from sand, glass beads, ground glass, or garnet, and mixtures thereof, although any abrasive material may be effective. The rotation speed of the spindle is chosen such that the abrasive material is effectively circulated for depassivation of the electrodes, and such that the apparatus circulates a chosen quantity of water. Rotation speeds between 100 and 1000 RPM are expected to be effective. Typical flow rates for the water through the apparatus with the above-described components are between about 1 gal./min. and about 5 gal./min., depending on the level of contamination of the liquid. Amounts and particle sizes of the abrasive materials are chosen such that the flow rate of the pumped water maintains an effective quantity of particles in suspension and circulating between the plates. Abrasive materials may be removed from the output stream by allowing these materials to settle, as an example, or by using a filtration process. Collected materials may subsequently be returned to container 12 for reuse as is illustrated in reference character, 117, in FIG. 4 hereof.

It has been found that the efficiency of electrocoagulation is related to the conductivity of the water. For a constant current density, the applied voltage may change from 6 V to as high as 70 V during the electrocoagulation process. Adding small amounts of table salt have been observed to increase the speed of the electrocoagulation process and decrease the power requirements. It has also been found that the consumption of the electrodes by ionization of the metal is a direct function of the current density. Since the conductivity of the water cannot readily be controlled, and may change over time, a constant current generator has been employed which changes the voltage across the electrodes to maintain the current at a constant value.

Electrodes having between about 2 in. and about 120 in. diameter, between about $1/32$ in. and about 1 in. thickness and spaced-apart between about $1/8$ in. and about 0.5 in. are expected to be effective for the electrocoagulation process of the present invention. The dimensions of the apparatus, the number of plates and the required current are determined by the volume of water to be treated per minute. Embodiments of the apparatus of the present invention are anticipated to be effective for processing water volumes between a few quarts per minute and thousands of gallons per minute.

Figure 2A:
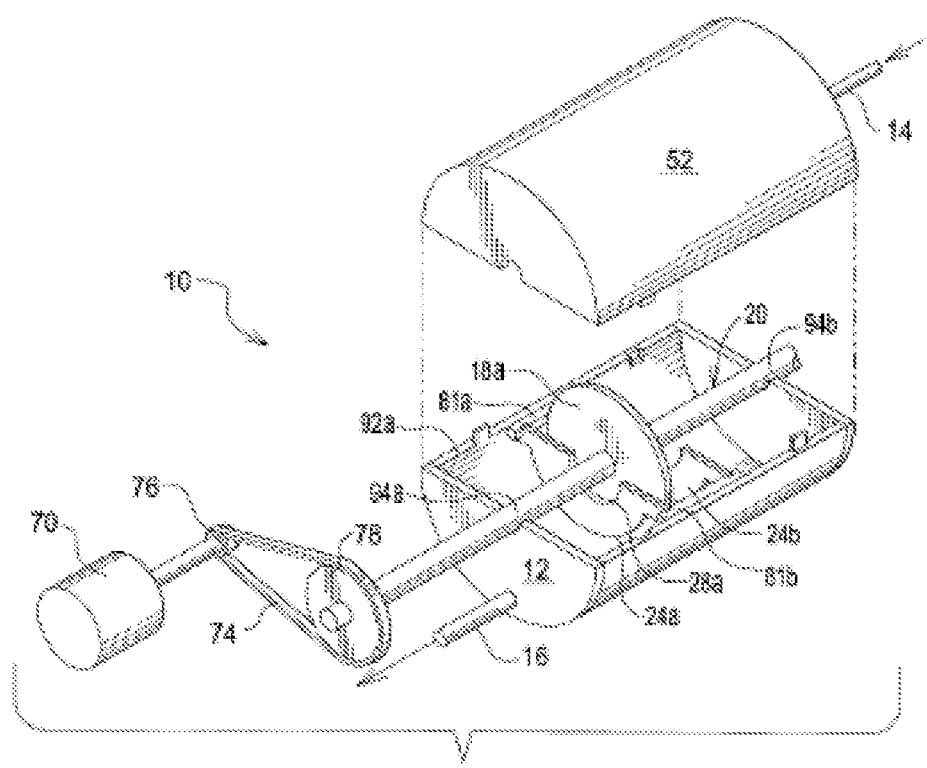
FIG. 2A is a schematic representation of perspective view of another embodiment of the electrocoagulation apparatus illustrating water entering and exiting the apparatus perpendicular to the electrode structure thereof.
Figure 2B:
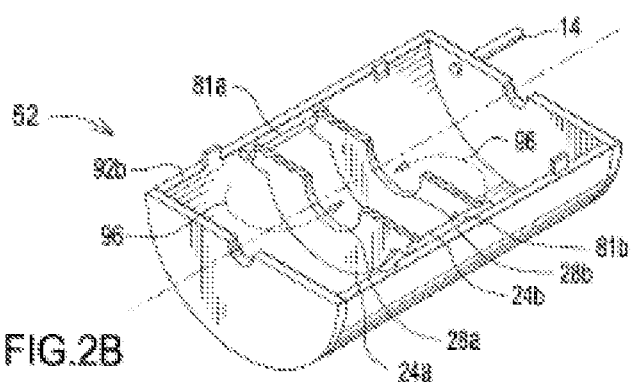
FIG. 2B is a schematic representation of the interior of the top lid showing the stationary electrodes and illustrating the expected flow of water through and around the electrodes as a result of the pumping action of the apparatus when the rotatable electrodes are placed in motion.
Figure 2C:
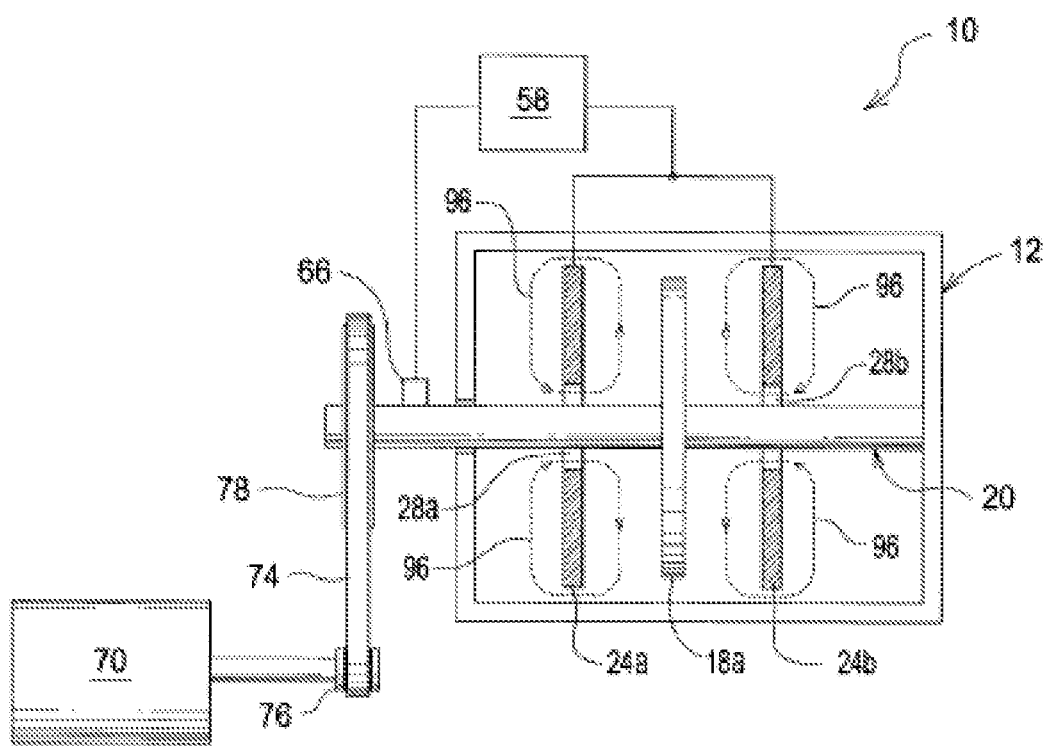
FIG. 2C is a schematic representation of a top view of the embodiment of the electrocoagulation apparatus shown in FIG. 2A hereof, again illustrating the expected water flow through and around the electrodes as a result of the pumping action of the apparatus.

FIG. 2A is a schematic representation of perspective view of another embodiment of the electrocoagulation apparatus illustrating water entering and exiting the apparatus through tubes 14 and 16, respectively, perpendicular to the electrode structure thereof shown as two stationary electrodes 24a and 24b, and rotating electrode 18a. Electrodes 24a and 24b are each illustrated as having two parts which are joined when lid 52 is in place, but may be fabricated as a single electrode. Water sealing gaskets for surfaces, 92a, and, 92b, and shaft seals, 94a, and 94b, for providing a water seal between rotating shaft 20 and container 12 and top portion 52, have not been shown, nor have the electrical connections to the electrodes, in order to simplify FIG. 2A. Apertures 28a and 28b in stationary electrodes 24a and 24b are sized to permit water to readily flow into the region between the stationary electrodes and the rotating electrode 18a as well as between the electrodes and the inner surfaces of container 12 and cover 52 as a result of the pumping action when shaft 20 rotates electrode 18a, while FIG. 2B is a schematic representation of the interior of lid 52 showing the stationary electrodes and illustrating the expected direction of the flow of water, 96, through and around the electrodes as a result of the pumping action of the electrodes. FIG. 2C is a schematic representation of a top view of the embodiment of the electrocoagulation apparatus shown in FIG. 2A hereof, again illustrating the expected water flow through and around the electrodes as a result of the pumping action of the rotating electrodes.

FIG. 3A is a schematic representation of a side view of electrocoagulation apparatus 10, wherein shaft 20 is oriented vertically and has hollow portion, 98, and open end, 100, for permitting water 96 to enter the shaft, and exit holes, 102a-102e, for permitting the water to exit the shaft, when electrodes 18a-18b are placed in rotary motion. FIG. 3B is a schematic representation of a perspective view of the apparatus shown in FIG. 3A hereof further illustrating peripheral slots, 104, in stationary electrode 24a for permitting water 96 to flow through the electrode, and a vertical orientation of the axis of rotation.

Figure 4:
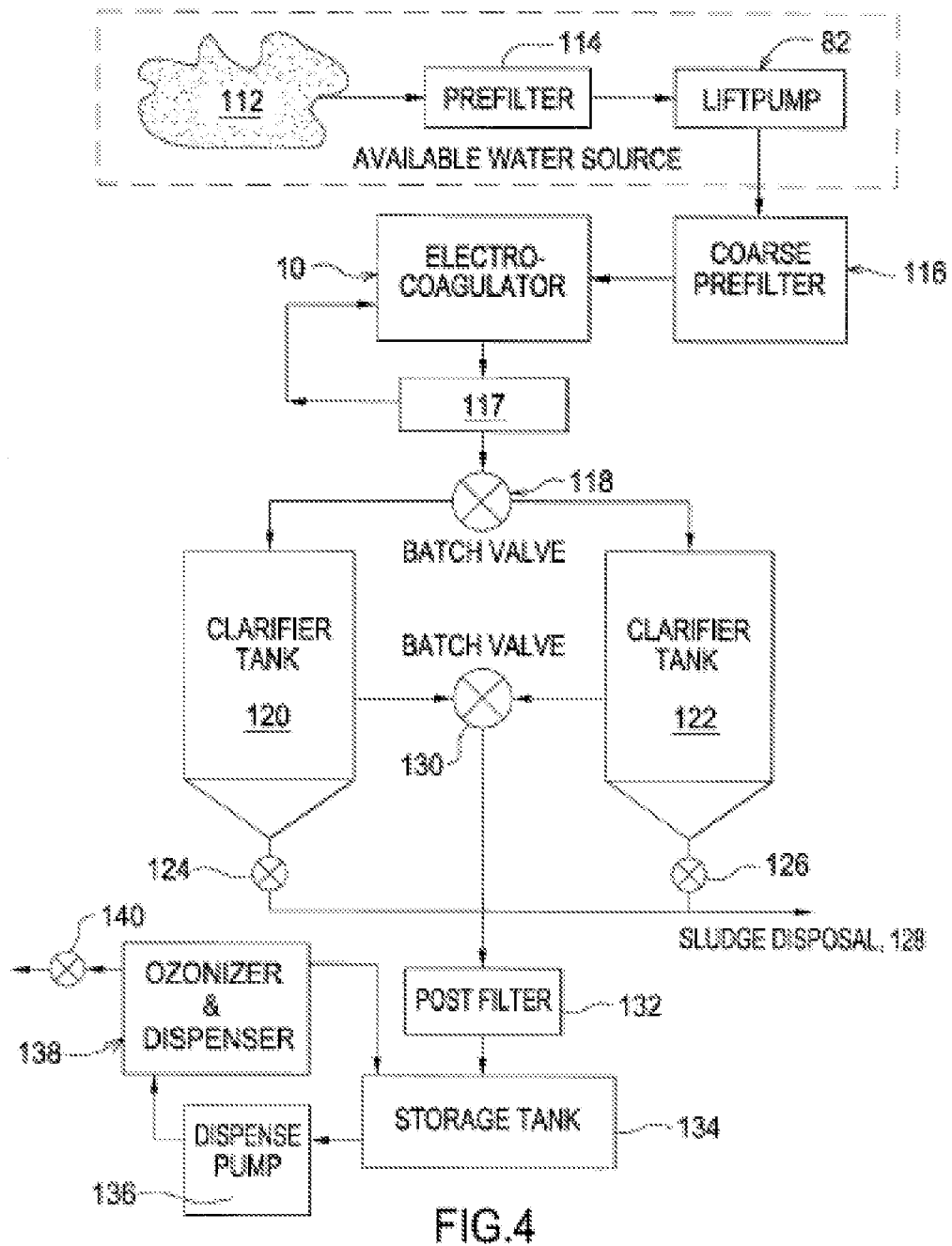
FIG. 4 is a schematic representation of the present electrocoagulation apparatus adapted for processing water from an available source such as a lake, well, mine, or ship bilge, as examples.

FIG. 4 is a schematic representation of the present electrocoagulation apparatus adapted for processing water from an available source, 112, such as a lake, well, mine, or ship bilge, as examples. The water from the source may be prefiltered using filter, 114, and introduced into electrocoagulator 10 using pump 82 for controlling the water flow rate and, hence the dwell time in the electrocoagulator. The water may be further filtered using coarse prefilter, 116. Abrasive exiting electrocoagulator 10 along with the treated water may be removed by separator, 117, and returned to coagulator 10. Treated water exiting coagulator 10 may be directed through batch valve, 118, to one or more clarifier tanks, 120, 122, where the electrocoagulated contaminants are separated by gravity from the water and directed through valves, 124, and 126, respectively, to sludge disposal location, 128. Purified water may be directed out of tanks 120 and 122 using valve 130, and may be further filtered using post filter, 132, and stored in tank, 134. Pump, 136, may be used to direct the water from tank 134 through ozonizer, 138, if additional purification is required, and dispensed using valve, 140. Whereas, FIG. 4 illustrates the separation of the electrocoagulated contaminants by batch processing, it is equally effective to use a continuous settling process or a continuous filtration process.

Having generally described the invention, the following EXAMPLES provide additional details:

Example 1

A mixture of 200 ml of coal dust and 3.7 L of water was added to a 1 gal. container having a similar configuration to that illustrated in FIGS. 3A and 3B, hereof, except that one aluminum rotating electrode and two aluminum stationary electrodes were employed. A voltage of 12 V was applied for 5 min. between the stationary and rotating electrodes, the rotating electrodes having 3" diameter, 1/16 in. thickness, spaced apart from the stationary electrodes by 1/4 in., and rotated at 600 rpm. The stationary electrodes were 1/16 in. thick. A current of about 5 A flowed between the electrodes. No abrasive or salt was added to the water. After coagulation, the processed water was allowed to stand for 5 min. and the turbidity was observed to change from high to low using a commercially available turbidity meter.

Example 2

A surrogate water sample having greater than 200 ppb of arsenic as $As^{3+}$, was flowed into a 1.25 gal. electrocoagulation cell similar to that illustrated in FIGS. 3A and 3B, hereof, at about 20 L/h having both iron and aluminum 3 in. diameter electrodes spaced 0.250 in. apart, on the same spindle rotated at about 900 rpm, and separated by an aluminum stationary electrode equally distant therebetween. Playground sand was used as the abrasive, the voltage between the rotating and stationary electrodes was 12 V and the current flow therebetween was about 5 A. After treatment, the water exiting the container was allowed to settle for 30 min., and then decanted without additional filtering. The arsenic concentration was found to be below the detectable limit of the testing apparatus employed, which was estimated to be less than 10 ppb. Analysis of the floc indicated an arsenic concentration of greater than 300 ppb. It is believed by the present inventors that the iron as $Fe^{+++}$ reacted with the arsenic and that the aluminum was effective in removing both the iron and the reacted arsenic.

Figure 5A:
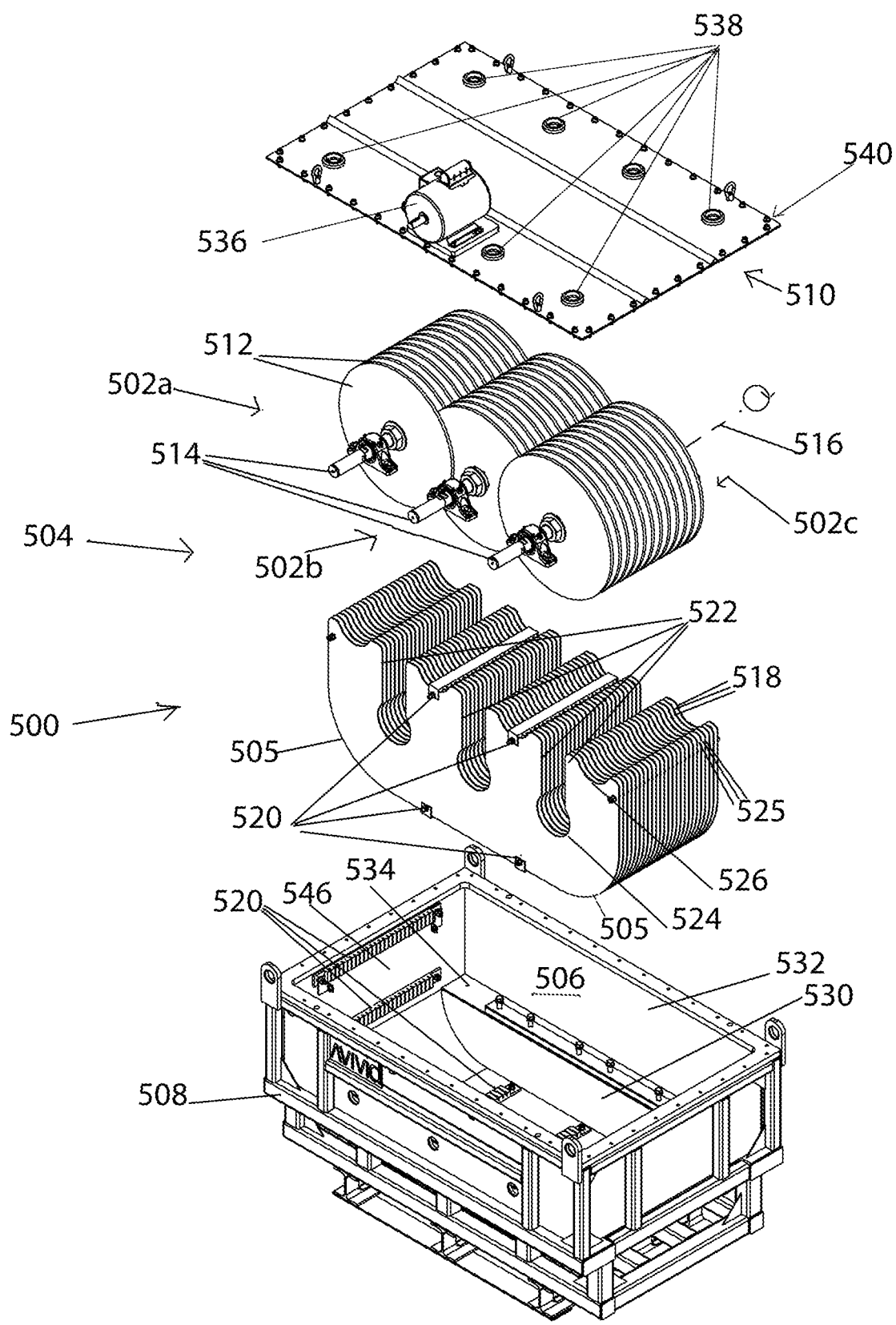
FIG. 5A is a schematic representation of an exploded view of another embodiment of the electrocoagulation apparatus.

FIG. 5A is a schematic representation of an exploded view of another embodiment of an electrocoagulation apparatus 500. The electrocoagulation apparatus 500 includes a set of three rotating electrode assemblies 502a-502c and a stationary electrode assembly 504 that are housed in a container 506. The container 506 fits into and is supported by a frame assembly 508. A lid assembly 510 is attached to a top of the frame 508 and encloses an open side of the container 506 and is on a topside of the apparatus 500. Each of the rotating electrode assembly's 502a-502c includes planar, circular, spaced-apart electrically conducting electrodes 512 ("rotating electrodes"). While the embodiment of FIG. 5A includes twelve rotating electrodes 512 in each rotating electrode assembly 502a-502c for a total of 36 electrodes 512, the number of rotating electrodes 512 may vary depending on any particular implementation. Similarly, while the embodiment in FIG. 5A includes three rotating electrode assemblies 502a-502c, the overall number of rotating electrode assemblies 502a-502c may vary depending on a particular implementation. Each rotating electrode 512 is disposed in parallel relation to additional rotating electrodes 512 along an electrically conducting shaft, spindle, or axle 514. Each rotating electrode assembly 502a-502c is capable of rotation about a longitudinal axis 516 that is disposed along its respective shaft 514. Electrodes 512 of one assembly 502a-502c are interleaved with electrodes 512 from an adjacent assembly 502a-502c. Stated differently, each set of the three rotating electrode assemblies 502a-502c are spaced-apart and offset such that a portion of the rotating electrodes 512 of one set overlap 513 with an adjacent rotating electrode 512 from a neighboring rotating electrode assembly 502a-502c. Thus, the rotating electrodes 512 from one of the outer rotating electrode assemblies 502a or 502c overlap and sandwich an electrode 512 from a central or inner electrode assembly 502b because the rotating electrodes 512 of the central electrode assembly 502b are slightly offset along its respective longitudinal axis 514 from the electrodes 512 of the outer rotating electrode assemblies 502a, 502c. In the embodiment of FIG. 5A, the rotating electrodes 512 are anodes, however the rotating electrodes 512 may readily function as cathodes.

Figure 8A:
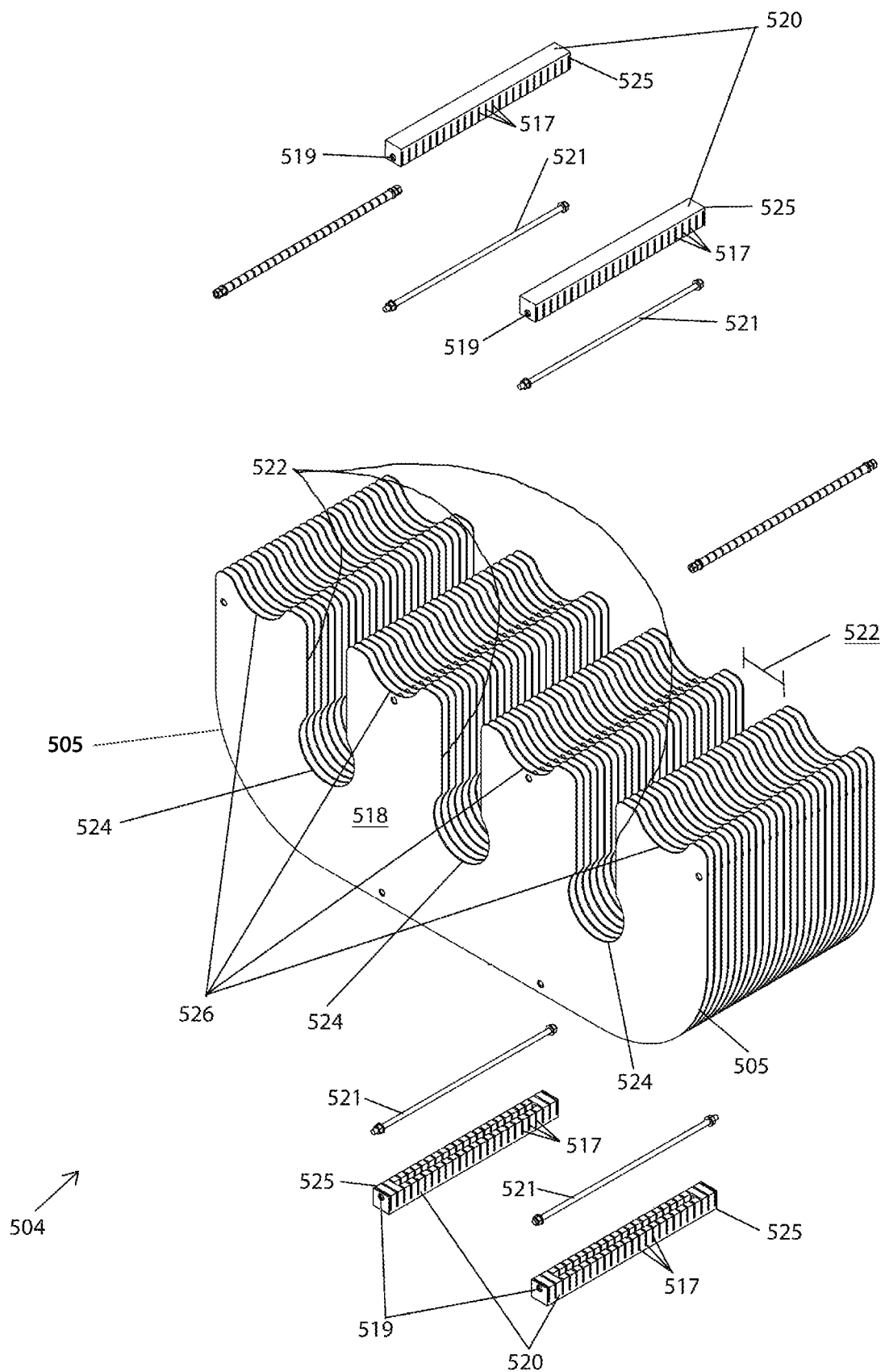
FIG. 8A is an exploded perspective view of the stationary electrode assembly of the electrocoagulation apparatus as illustrated in FIG. 5A.
Figure 8B:
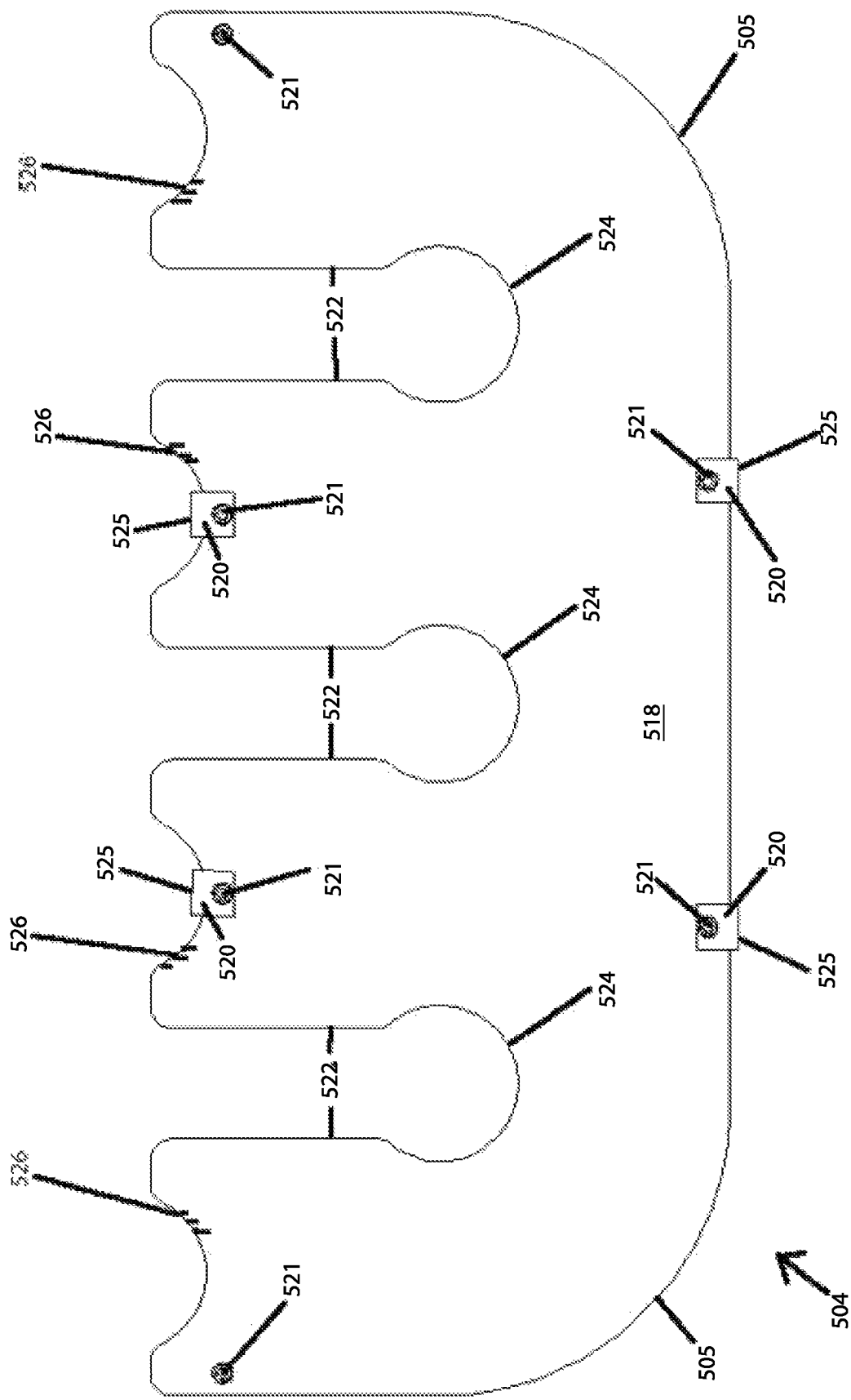
FIG. 8B is a front view of the stationary electrode assembly of the electrocoagulation apparatus as illustrated in FIG. 5A.

Referring again to FIG. 5A, as well as FIGS. 8A-8B, the stationary electrode assembly 504 include a plurality of stationary, planar, spaced-apart, electrically conducting electrodes 518 ("stationary electrodes"). The stationary electrodes 518 are disposed in proximity of and parallel with the rotating electrodes 512 such that each rotating electrode 512 is sandwiched between a pair of the stationary electrodes 518. The stationary electrodes 518 and the rotating electrodes 512 are oriented generally parallel to each other and substantially vertical within the container 506 such that a gravitational force of the fluid is parallel to the planar electrodes 512, 518 and thus a fluid flow is not unduly impeded by the gravitational force of the fluid. While the electrodes 512, 518 may be oriented such that they are not substantially vertical, a substantially vertical orientation ensures circulation of an abrasive material, such as sand, within the container. The stationary electrodes 518 are held in place in a spaced-apart orientation via electrode spacers 520 positioned on a perimeter of the electrode assembly 504. Each of the electrode spacers 520 include a square shaft 525 with uniformly spaced slots 517 that are sized to receive a width of the stationary electrode 518 when the spacer 520 engages with the electrodes 518. The electrode spacers 520 further includes a bore 519 along a longitudinal axis of the square shaft 525 that is additionally through the slots 517. Each of the stationary electrodes 518 includes a matching bore that is collinear with the bore 519 in the electrode spacer 520 when the slots 517 engage with the width of the stationary electrodes 518. A threaded member 521 may penetrate the bores 519 of the electrodes 518 and the spacer 520 to secure the spacer 520 to the electrodes 518 by way of fasteners at ends of the threaded member 521. In the embodiment of FIG. 5A, the stationary electrode assembly 504 includes twenty-five stationary electrodes 518, however, the number can vary accordingly. For example, the embodiment as illustrated in FIG. 9 depicts an electrocoagulation apparatus 500 with six stationary electrodes 518. In the embodiment of FIG. 5A, the stationary electrodes 518 are cathodes, however the stationary electrodes 518 may readily function as anodes.

Referring still to the embodiment in FIG. 5A, as well as FIGS. 8A-8B, each of the stationary electrodes 518 includes three vertical cutouts 522 that are shaped to receive the shafts 514 of the respective rotating planar electrode assemblies 502a-502c and to permit the shafts 514 to pass through the cutouts 522 without coming in contact therewith. More specifically, each cutout 522 defines an upper channel section 522 and a lower circular section 524. The lower semi-circular shaft cutout 524 is sized larger than the vertical upper sections 522. The lower semi-circular sections 524 permits the rotating electrodes 512 to be received therein and also permit water to flow more freely within volumes formed between the rotating electrodes 512 and the stationary electrodes 518, and along the circular shaft 514 positioned in the circular sections 524. When the rotating electrode assemblies 502a-502c are received within the stationary electrode assembly 504, the shaft cutouts 524 surrounds the shafts 514 and provides a flow path for water to circulate within the apparatus.

The stationary electrodes 518 include generally planar opposing faces and a topside that defines arcuate cutouts 526 on either side of the vertical cutouts 522 that generally match an underside of the lid assembly 510, which includes semi-circular diffusors 540 that match the arcuate cutouts 526 on the stationary electrode assembly 504. A bottom side of the stationary electrodes 518 extends linearly between opposing sides and is substantially orthogonal to the opposing of sides. Between the bottom side and the opposing sides are rounded corners 505 that generally match a bottom surface of the container 506.

Although electrodes 512 are shown as being circular, other shapes having an axis of rotation may be contemplated. The electrodes 512 may be constructed using reactive metals such as aluminum, iron, calcium, and magnesium, as examples, while electrodes 518 may be constructed from an inert conducting material such as stainless steel, titanium, platinum, and graphite, as examples. On the other hand, the stationary electrodes 518 may be fabricated from reactive metals, whereas the rotating electrodes 512 may be fabricated from inert materials. Additionally, electrodes fabricated from different reactive metals may be employed on the same shaft 514.

As seen in FIG. 5A, the stationary electrode assembly 504 and the rotating electrode assemblies 502a-502c are housed within the container 506. The container 506 secures the stationary electrode assembly 504 in place with electrode spacers 520 positioned on an inner surface of the container. The electrode spacers 520 are similar to those discussed with respect to the stationary electrode assembly 504, except that they are mounted to the inner surface of the container and the spacers 520 slideably receive the stationary electrodes 518 when the assembly 504 is inserted into the container 506. In the particular embodiment shown in FIG. 5A, two electrode spacers 520 engage each side of the stationary electrodes 518 and two electrode spacers 520 engage the bottom side of the stationary electrodes 518. The container 506 is shaped such that there is a narrower bottom portion 530 that is slightly wider than the stationary electrode assembly. The container 506 also includes a platform 534 that transitions the narrow bottom portion 530 to a wider upper portion 532, the platform accommodating the placement of mounting hardware on the rotating electrode assemblies 502a-502c. As mentioned previously, the container 506 includes a bottom surface that is generally planar with rounded corners 505 and orthogonal sides that generally match a profile of the stationary electrode assembly 504. An outlet (not shown) for treated water and/or abrasive material may be located at or near the bottom surface of the container 506.

The container 506 is supported on an exterior surface by the frame 508. As seen in FIGS. 5A and 5C, the frame 508 supports the container 506 with a tube steel type structure, which distributes a weight of the various assemblies and the water during the electrocoagulation process. While FIG. 5A depicts a tube steel type structure, various other structures are possible to support the weight of the apparatus 500.

Referring to FIGS. 5A and 6A-6C, once the rotating electrode assemblies 502a-502c and the stationary electrode assembly 504 are in the container 506, the lid assembly 510 encloses the apparatus 500. The lid assembly 510 includes a top surface that includes a motor 536 that drives the shafts 514 of the rotating electrode assemblies 502a-502c via a belt or similar device. The top surface further includes ports 538 that communicate from the top surface to a bottom surface of the lid assembly 510. The ports 538 introduce an inlet flow of contaminated water as well as an abrasive material into the apparatus 500. The ports 538 communicate with a diffuser 540 on the bottom side of the lid assembly, which further includes diffusion ports 541 that disperse an inlet flow of water or abrasive material into the container 506 and in contact with the electrode assemblies 504, 502a-502c. In the embodiment of FIG. 5A, there are four diffusers 540 that extend between opposing ports along a same direction as the shafts 514 of the rotating electrode assemblies 502a-502c. The diffusers 540 have a semi-circular cross-section that matingly engages with the arcuate cutouts 526 on the electrodes 518 when the lid assembly 510 encloses the apparatus 500.

FIG. 5B shows a top view of the embodiment of the electrocoagulation apparatus illustrated in FIG. 5A, with the lid assembly 510 removed. As seen in FIG. 5B, the shafts 514 of the rotating electrode assemblies 502a-502c are supported by a pair of pillow block bearings 542 that are fixedly mounted to the platform 534 of the container 506 at either end of the shaft 514. The pillow block bearings 542, also known as plummer blocks or bearing housings, supports the weight of the rotating electrode assemblies 502a-502c as the shafts 514 rotate on the pillow block bearings 542.

Figure 7:
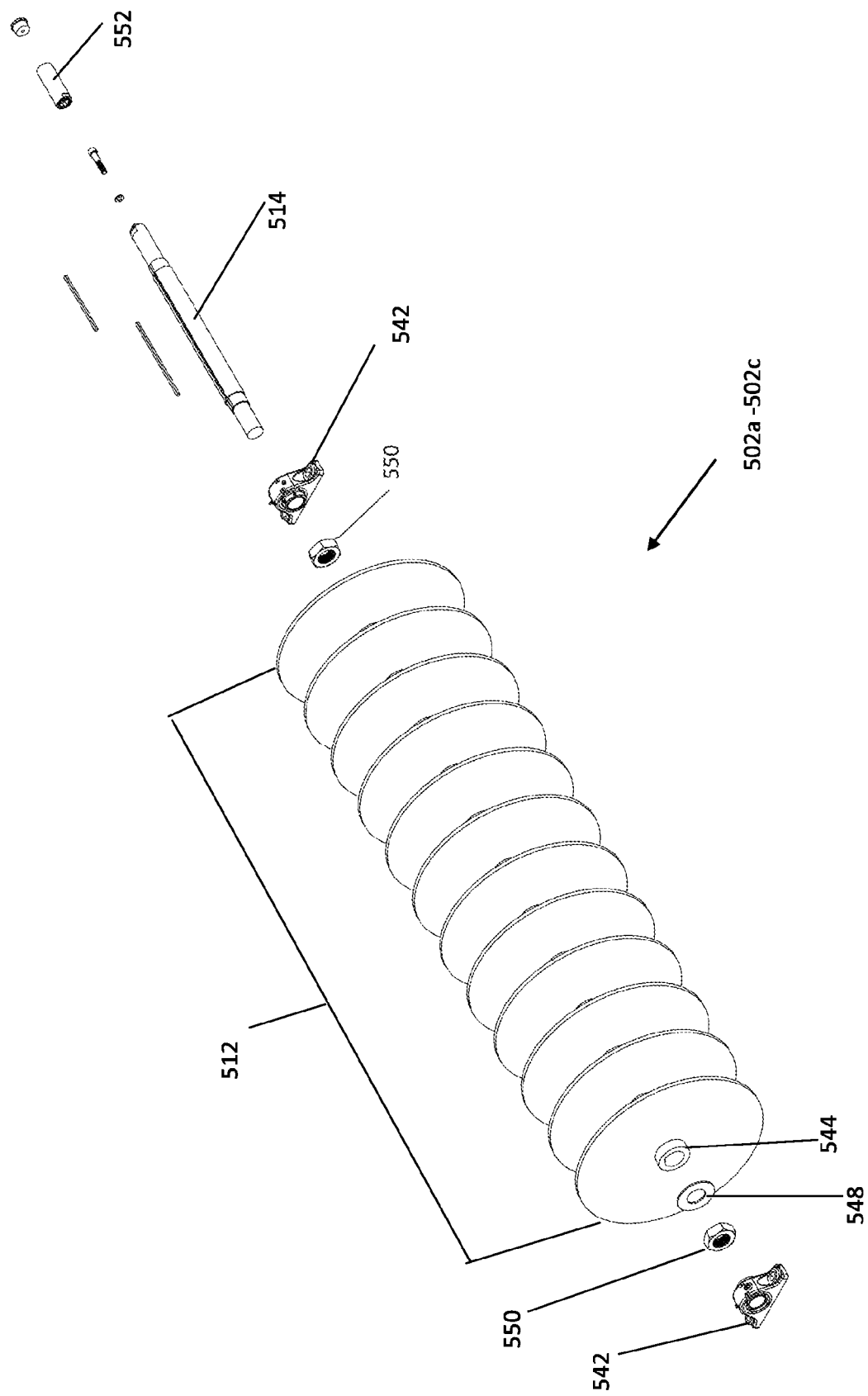
FIG. 7 is an exploded perspective view of the rotating electrode assembly of the electrocoagulation apparatus as illustrated in FIG. 5A.

Referring to the rotating electrode assemblies 502a-502c in FIGS. 5B and 7, the rotating electrodes 512 on the shaft 514 are separated by bushings 544, which may be sleeve bushings or split bushings, among others. The bushings 544 slide over the shaft 514 during assembly of the rotating electrode assemblies 502a-502c and provide a spacing between the electrodes 512. Relative placement of the electrodes 512 and bushings 544 along the shaft 514 enables the electrodes 512 on the outer rotating electrode assemblies 502a, 502c to overlap with the electrodes 512 of the inner rotating electrode assembly 502b. Stated differently, the placement of the bushings 544 and electrodes 512 on the outer assemblies 502a, 502c are offset from the bushings 544 and electrodes 512 on the inner assembly 502b. In this way, a portion of the electrodes 512 on the outer assemblies 502a, 502c overlap and are interleaved with but do not contact a portion of the electrodes 512 on the inner assembly 502b.

As evident in FIG. 5B-5C, the stationary electrodes 518 are secured to inner sides of the container 506 by the electrode spacers 520. There is, however, a side gap 546 between the stationary electrodes 518 and the inner sides of the container 506. Additionally, there are end gaps 547 in the container 506 defined between outer most stationary electrodes and an inner wall of the container 506. The side gaps 546 and the end gaps 547 facilitate circulation of contaminated water and abrasive material within the apparatus 500 during electrocoagulation and will be discussed further with respect to FIG. 9.

FIG. 5C illustrates an isometric view of the assembled apparatus illustrated in FIG. 5B. A first stationary electrode 518, most near a location where the shaft 514 extends through the container 506 to communication with the belt of the motor 536, is shown transparently in order to view an overlap between rotating electrodes 512.

Figure 6B:
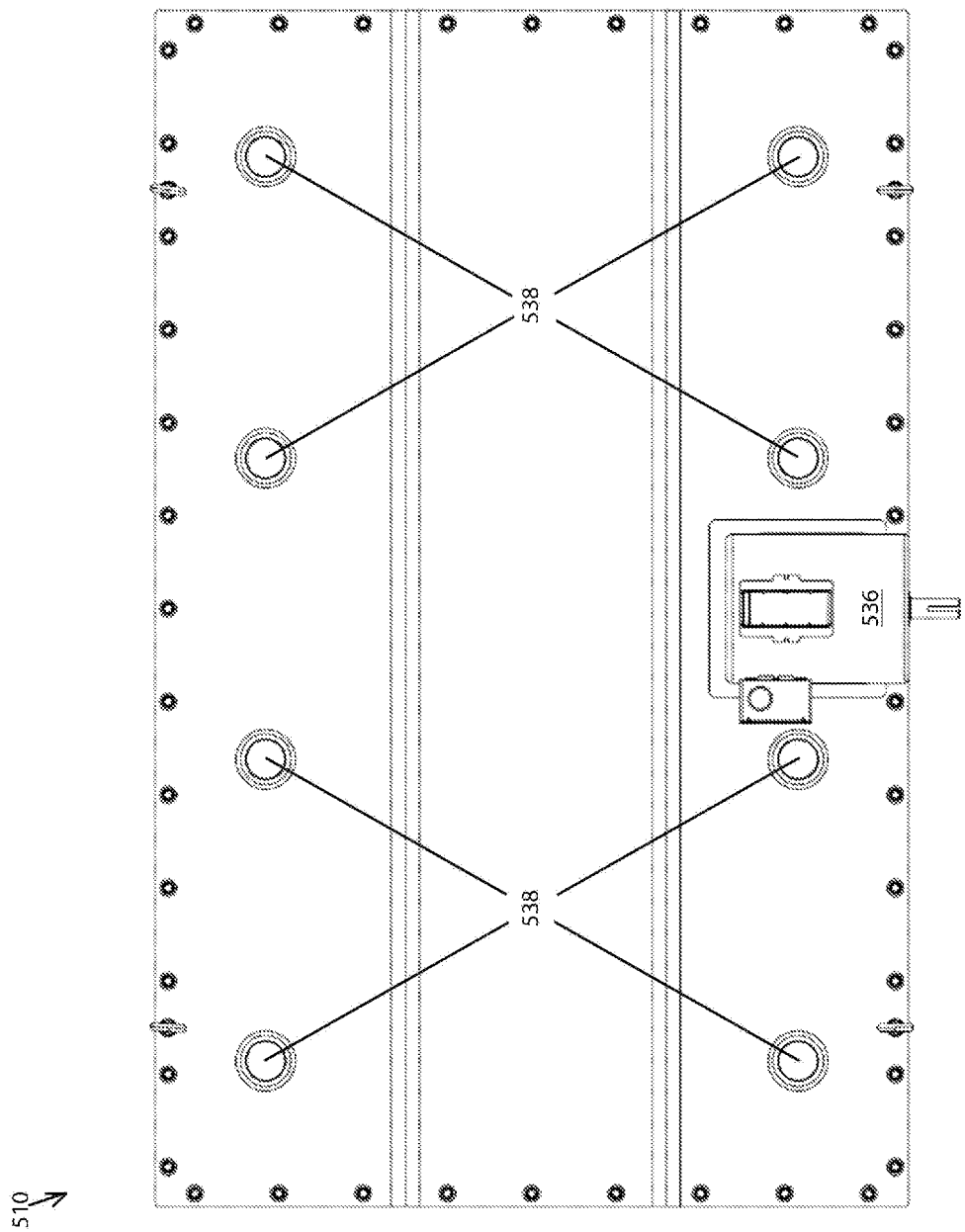
FIG. 6B is a top view of the lid assembly of the electrocoagulation apparatus as illustrated in FIG. 5A.
Figure 6C:
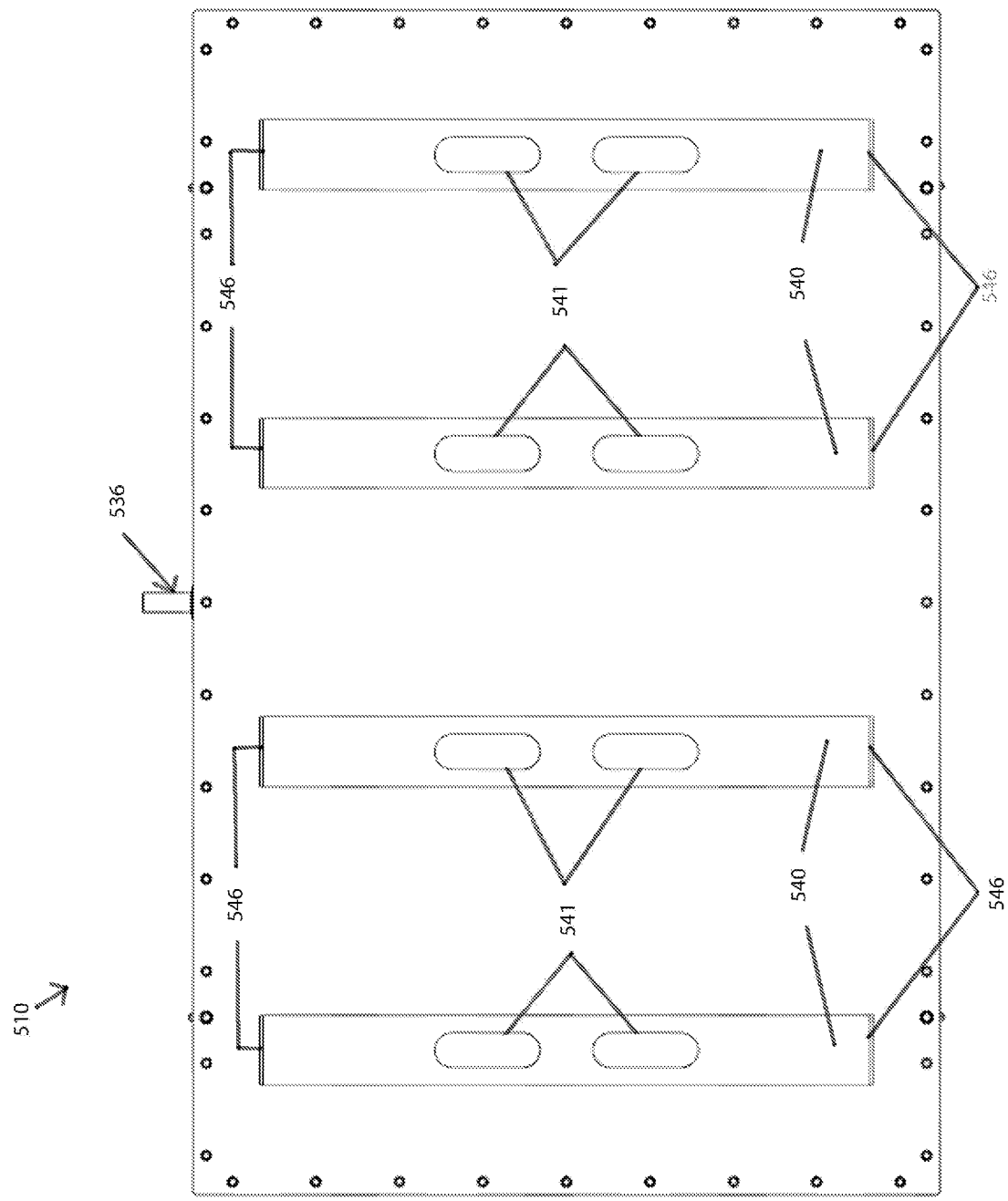
FIG. 6C is a bottom view of the lid assembly of the electrocoagulation apparatus as illustrated in FIG. 5A.

FIGS. 6A-6C further illustrate the lid assembly 510. As mentioned previously, the lid assembly 510 includes a top surface with a motor 536 mounted on a motor mount and inlet ports 538 for introducing contaminated water and an abrasive material into the apparatus 500. The motor 536 is powered by an electric power source, which drives a belt that is attached to a pulley, which in turn drives the rotation of the shafts 514 of the rotating electrode assemblies 502a-502c. The power source may include batteries, solar cells, and appropriate line voltage. As seen in FIG. 6B, the diffusors 540 are located under sets of two inlet ports 538 on the bottom surface of the lid assembly 510. The diffusors 540 further include diffusion ports 541 on a center portion of the diffusors 540 and end caps 546 at outer ends of the diffusors 540. The diffusors 540 aid in decreasing a water pressure inlet flow between the inlet port 538 and a first contact of the water with the electrode assemblies 502a-502c, 504. Inlet water pressure from an inlet port 538 loses pressure as it enters the diffusor 540. The water is blocked at each end of the diffusor 540 by the end caps 546 and is forced out of the diffusor ports 541 and into contact with the electrode assemblies 502a-502c, 504.

FIG. 7 is an exploded view of the rotating electrode assemblies 502a-502c. The electrodes 512 are positioned on the shaft 514 with bushings 544 between the electrodes 512. While the electrodes 512 in this embodiment are circular, the electrodes 512 may be shaped differently. The electrode assembly includes spacers 548 between an outer bushing 544 and a nut 550. Additionally, each assembly 502a-502c includes a shaft extension 552. The arrangement and positioning of the electrodes 512 and bushings 544 on the shaft 514 are based on whether the assembly is an outer assembly 502a, 502c or inner assembly 502b. Generally, an inner assembly 502b will include a bushing 544 in a corresponding location where an outer assembly 502a, 502c will include an electrode 512 and vice versa.

FIG. 8A is an exploded view of the stationary electrode assembly 504 as illustrated in FIG. 5A and FIG. 8B is a front view of the assembly 504. The individual stationary electrodes 518 are secured in a uniform spacing by way of the electrode spacers 520 positioned on the top side and bottom side of the electrode assembly 504. As mentioned previously, the electrode spacers 520 include a square shaft 525 with slots 517 that are configured to receive a width of the electrode 518 and a bore 519 through a longitudinal axis of the spacer 520. When the slots 517 engage with the widths of each of the electrodes 518, the bore 519 is collinear with a bore through the electrodes 518 that is sized to receive a threaded member 521. The threaded member 521 may be secured at its ends by a corresponding threaded fastener to secure the spacer 520 to the electrodes 518. Additional electrode spacers 520 are secured to the sides of the internal surface of the container 506. These spacers 520 ensure correct spacing on the sides of the electrodes 518.

FIG. 9 depicts water flow patterns in the electrocoagulation apparatus 500 as illustrated in FIG. 5A, with the exception that the apparatus 500 in FIG. 9 includes fewer electrodes 512, 518 in order to more clearly depict the flow paths. The rotating electrodes 512, which are interleaved between stationary electrodes 518, act as a fluid pump to force water radially outward from the shaft 514 on both sides of the rotating electrode 512 when the electrode 512 rotates. The water is "pumped" outward from each of the shafts 514 and the water is drawn in a circular return path through one or more of the openings or gaps in the semi-circular shaft cutouts 524, the vertical cutouts 522, and/or the side gaps 546.

To illustrate an example of a flow path in the electrocoagulation apparatus, references is made to FIG. 9. In a first example, a first volume 554 of water is defined between a rotating electrode 512 in the outer rotating electrode assembly 502c and a neighboring stationary electrode 518. As the shaft 514 rotates, the water in the first volume is "pumped" or forced to move radially outward from the shaft 514 because of a boundary layer effect created by the viscous nature of the fluid and the proximity between the rotating electrode 512 and the stationary electrode 518. As the water travels outward from the shaft 514, the water is drawn into a second volume 556 through the semi-circular shaft cutout 524 and/or the vertical cutout 522 in the stationary electrode assembly 504. The water is drawn into the second volume 556 because of a relative pressure gradient between the respective volumes 554, 556. The second volume 556 is defined between the stationary electrode 518 and a rotating electrode 512 in the inner rotating electrode assembly 502b. As the water enters the second volume 556 it encounters the boundary layer flow effect created by the rotating electrode 512 from the inner rotating electrode assembly 502b and is thus pumped or drawn back towards the outer rotating electrode assembly 502c. The water encounters a low pressure effect at the semi-circular shaft cutout 524 and/or the vertical cutout 522 in the stationary electrode assembly 504 that is adjacent the shaft 514 of the outer rotating electrode assembly 502c and is caused to flow back into the first volume therein. The circulation pattern just described continues during the electrocoagulation process throughout various volumes defined between rotating electrodes 512 and stationary electrodes 518 throughout the apparatus 500.

To further illustrate the flow path of water in the apparatus 500 through the side gaps 546 and the end gaps 547, attention is again directed to FIG. 9. As a second example, a third volume 560 of water is defined between the rotating electrode 512 on the outer rotating electrode assembly 502a and the stationary electrode 518. It is noted that although the electrodes 512, 518 are in a corner of the container 506, a circular flow path is maintained via flow through the side gaps 546 and the end gaps 547. As the rotating electrode 512 rotates, water in the third volume 560 is forced radially outward and towards the side gap 546. Because the stationary electrode 518 permits the side gap 546 between the electrode 518 and an inner surface of the container 506, the water has a flow path around the stationary electrode and into the end gap 547, which a fourth volume 558 occupies. A low pressure effect at the semi-circular shaft cutout 524 and/or the vertical cutout 522 in the stationary electrode assembly 504 draws the water in the fourth volume 558 to pass through the cutouts 522 or 524 and to reenter the third volume 560. Although the previous examples are directed to the embodiment in FIG. 9 for ease of illustration and clarity, the flow paths and illustrated volumes 554, 556, 558, 560 are equally applicable to the embodiment illustrated in FIG. 5A.

Similarly as discussed in reference to the embodiment of FIG. 1A, among others, an electric current is caused to flow between each rotating and stationary electrode 518, 512, which thereby produces electrocoagulation of the contaminants in the water flowing therebetween. A direct current source of between about 3 to about 24 volts is applied to the stationary electrodes 518 to produce the electrocoagulation in the apparatus 500. The amount of voltage applied depends on various factors including a water quality of the contaminated water and the respective conductivity of the water.

In use, the container 506 is filled with water to be treated such that the electrodes 512, 518 are in contact therewith. Generally, the electrodes are submerged in the water, although complete immersion is not required. An amount of insoluble abrasive material effective for keeping the electrodes free of scale and other coatings may be introduced into container 506 if the raw water sample to be treated contains inadequate abrasive material suspended therein. As discussed previously, the abrasive material may be chosen from sand, glass beads, ground glass, or garnet, and mixtures thereof, although any abrasive material may be effective. The pumping action created by the interaction of the stationary and rotating electrodes 518, 512 continuously re-exposes the water and the abrasive material to the electrodes 512, 518 during the electrocoagulation process which enables the reactor to be employed for a given volume of water to be processed. For the apparatus 500 illustrated in FIG. 5A, flow rates for the water through the apparatus 500 with the above-described components may be between about 10 gal./min. and about 75 gal./min., depending on the level of contamination of the water. Amounts and particle sizes of the abrasive materials are chosen such that the flow rate of the pumped water maintains an effective quantity of particles in suspension and circulating between the electrodes 512, 518. Abrasive materials may be removed from the output stream by allowing these materials to settle, as an example, or by using a filtration process. Collected materials may subsequently be returned to the container 506 for reuse. The rotation speed of the spindle 514 is chosen such that the abrasive material is effectively circulated for depassivation of the electrodes, and such that the apparatus 500 circulates a chosen quantity of water. Rotation speeds of the spindle 514 of between about 100 and about 2000 RPM may be employed, although other speeds are possible.

It has been found that the efficiency of electrocoagulation is related to the conductivity of the water. For a constant current density, the applied voltage may change from 3 V to as high as 70 V during the electrocoagulation process. Adding small amounts of salt or other electrolytes (e.g., sodium chloride, magnesium sulfate) have been observed to increase the speed of the electrocoagulation process and decrease the power requirements. It has also been found that the consumption of the electrodes 512 or 518 by ionization of the metal is a direct function of the current density. Since the conductivity of the water cannot readily be controlled, and may change over time, a constant current generator has been employed which changes the voltage across the electrodes to maintain the current at a constant value.

In the embodiment of the apparatus 500 as illustrated in FIG. 5A, the rotating electrodes 512 may have a diameter between about 2 in. and about 120 in., a thickness between about 1/32 in. and about 1 in. and spaced-apart between about 1/8 in. and about 0.5 in. The dimensions of the apparatus 500, the number of electrode plates 512 and the required current are determined by the volume of water to be treated per minute. Embodiments of the apparatus 500 are anticipated to be effective for processing water volumes between a few quarts per minute and thousands of gallons per minute.

The foregoing description of the various embodiments has been presented for purposes of illustration and description and is not intended to be exhaustive or to limit the disclosure to the precise form disclosed, and obviously many modifications and variations are possible in light of the above teaching. The embodiments were chosen and described in order to best explain the principles of the various embodiments and its practical application to thereby enable others skilled in the art to best utilize the various embodiments and with various modifications as are suited to the particular use contemplated. It is intended that the scope of the disclosure be defined by the claims appended hereto.

We claim:

1. An apparatus for removing contaminants from contaminated fluid, comprising in combination:
   a container for holding a fluid;
   a first axle rotatably mounted in the container and supporting a first rotatable planar electrode, said first rotatable planar electrode being substantially vertical;
   a second axle rotatably mounted in the container and supporting a second rotatable planar electrode, said second rotatable planar electrode being substantially vertical;
   a first planar stationary electrode positioned between said first and said second rotatable planar electrodes and including opposite planar faces, a first opening, and a second opening, said first opening permitting said first axle to pass through said first opening and forming a first volume between said first axle and said first planar stationary electrode, said second opening permitting said second axle to pass through said second opening and forming a second volume between said second axle and said first planar stationary electrode, said first planar stationary electrode being substantially vertical and parallel to said first and said second rotatable planar electrodes, said first and said second rotatable planar electrodes and said first planar stationary electrode being disposed in said fluid;
   a source of electrical current in electrical contact with said first planar stationary electrode and said first and said second rotatable planar electrodes effective for causing electrocoagulation of the contaminants in said fluid; and
   a motor configured to rotate said first and said second axles at a chosen angular velocity such that said fluid is caused to pass through said first volume and to flow radially outward from said first axle and cause water to flow through said first opening toward said at least one first rotatable planar electrode.

2. The apparatus of claim 1,
   the apparatus further comprising a second planar stationary electrode having a third opening and a fourth opening, said third opening forming a third volume between said first axle and said second planar stationary electrode and permitting said first axle to pass through said third opening, said fourth opening forming a fourth volume between said second axle and said second planar stationary electrode and permitting said second axle to pass through said fourth opening, said second planar stationary electrode being substantially vertical and parallel to said first and second rotatable planar electrodes, said first and second planar stationary electrode being disposed in said fluid, said first rotatable planar electrode positioned between said first and second planar stationary electrodes.

3. The apparatus of claim 2, wherein said first stationary electrode has a fifth opening for permitting water to pass through, said fifth opening is contiguous with said first opening, and wherein said second stationary electrode has a sixth opening for permitting water to pass through, said sixth opening is contiguous with said third opening.

4. The apparatus of claim 3, wherein said fifth opening is positioned above said first opening and said sixth opening is positioned above said third opening when said first and second stationary electrodes are supported in the container, said fifth and said sixth openings being configured to receive one of the axles during assembly and replacement.

5. The apparatus of claim 3, further comprising a third rotatable planar electrode supported by said first axle and capable of being rotated about said first axle;
   said third rotatable planar electrode positioned between the second and a third planar stationary electrode;
   said third planar stationary electrode having a seventh opening, said seventh opening forming said fourth volume between said first axle and said third planar stationary electrode and permitting said first axle to pass through said seventh opening, said third planar stationary electrode being substantially vertical and parallel to said first rotatable planar electrode; and
   a fourth planar stationary electrode having an eighth opening, said eighth opening forming a fifth volume between said first axle and said fourth planar stationary electrode and permitting said first axle to pass through said eighth opening, said fourth planar stationary electrode being substantially vertical and parallel to said first rotatable planar electrode.

6. The apparatus of claim 5, wherein a sixth volume is formed between said second and third planar stationary electrodes such that said fluid circulates unimpeded in said sixth volume before recirculation into said third and fourth volumes, thereby enhancing electrocoagulation and scale removal.

7. The apparatus of claim 5, further comprising a fourth rotatable planar electrode supported by said second axle and capable of being rotated about said second axle, said fourth rotatable planar electrode being substantially parallel with said first, said second, and said third rotatable planar electrodes, said fourth rotatable planar electrode positioned between said third and said fourth planar stationary electrodes.

8. The apparatus of claim 1, wherein said first axle and said second axle are spaced apart such that a portion of said second rotatable planar electrode interleaves with said first rotatable planar electrode.

9. An apparatus for removing contaminants from contaminated fluid, comprising in combination:
   a container for holding a fluid;
   a first axle rotatably mounted in the container and supporting a first rotatable planar electrode, said first rotatable planar electrode being substantially vertical;
   a second axle rotatably mounted in the container and supporting a second rotatable planar electrode, said second rotatable planar electrode being substantially vertical;
   a first planar stationary electrode positioned between said first and said second rotatable planar electrodes, said first planar stationary electrode being substantially vertical and having opposite planar faces, said first planar stationary electrode having a first opening, said first opening forming a first volume between said first axle and said first planar stationary electrode and permitting said first axle to pass through said first opening, said first planar stationary electrode having a second opening, said second opening forming a second volume between said second axle and said first planar stationary electrode and permitting said second axle to pass through said second opening, said first planar stationary electrode being substantially vertical and parallel to said first and said second rotatable planar electrodes, said first and said second rotatable planar electrodes and said first planar stationary electrode being disposed in said fluid;
   a source of electrical current in electrical contact with said first planar stationary electrode and said first and said second rotatable planar electrodes effective for causing electrocoagulation of the contaminants in said fluid; and
   a motor coupled with said first and said second axles and configured to rotate said first and said second axles at a chosen angular velocity such that said fluid is caused to pass through said first and said second volumes and to flow radially outward from said respective first and second axles along said opposite planar faces of said first planar stationary electrode and cause water to flow radially inward through said respective first and second openings toward said respective first and said second rotatable planar electrodes.

10. The apparatus of claim 9, wherein said first stationary electrode has a third opening and a fourth opening for permitting the water to pass through said respective third and fourth openings, wherein said third opening is contiguous with said first opening and said fourth opening is contiguous with said second opening, said third opening and said fourth opening are positioned above said first opening and said second opening respectively when supported in the container, said third and fourth openings being configured to receive said first and said second axles during assembly and replacement.

11. The apparatus of claim 9, wherein said first axle and said second axle are spaced apart such that a portion of said first planar rotatable electrode overlaps with a portion of said second planar rotatable electrode.

12. The apparatus of claim 9, further comprising a third rotatable planar electrode supported by said first axle and capable of being rotated about said first axle.

13. The apparatus of claim 12, further comprising a second planar stationary electrode positioned between said second and said third rotatable planar electrodes, said second planar stationary electrode being substantially vertical and having opposite planar faces, said second planar stationary electrode having a fifth opening, said fifth opening forming a third volume between said first axle and said second planar stationary electrode and permitting said first axle to pass through said fifth opening, said second planar stationary electrode having a sixth opening, said sixth opening forming a fourth volume between said second axle and said second planar stationary electrode and permitting said second axle to pass through said sixth opening.

14. The apparatus of claim 13, wherein said second planar stationary electrode has a seventh opening and an eighth opening for permitting water to pass through said respective seventh and eighth openings, wherein said seventh opening is contiguous with said fifth opening and said eighth opening is contiguous with said sixth opening.

15. The apparatus of claim 14, wherein said seventh opening and said eighth opening are positioned above said fifth opening and said sixth opening respectively when supported in the container, said seventh and eighth openings being configured to receive said first and said second axle during assembly and replacement.

16. The apparatus of claim 15, further comprising:
a third axle rotatably mounted in the container and supporting a fourth rotatable planar electrode, said fourth rotatable planar electrode being substantially vertical;
wherein said first planar stationary electrode further comprises a ninth opening, said ninth opening forming a fifth volume between said third axle and said first planar stationary electrode and permitting said third axle to pass through said ninth opening.

17. The apparatus of claim 16, wherein said second planar stationary electrode further comprises a tenth opening, said tenth opening forming a sixth volume between said third axle and said second planar stationary electrode and permitting said third axle to pass through said tenth opening.

18. The apparatus of claim 17, wherein said fourth rotatable planar electrode is positioned in a plane that is parallel to a first plane defined by said first rotatable planar electrode,
wherein said first, said second, said third, and said fourth rotatable planar electrodes are anodes,
wherein said first and said second planar stationary electrodes are cathodes.

\* \* \* \* \*